(12) United States Patent
Dewberry et al.

(10) Patent No.: US 9,383,436 B2
(45) Date of Patent: Jul. 5, 2016

(54) ONE WAY TIME OF FLIGHT DISTANCE MEASUREMENT

(71) Applicant: TDC Acquisition Holdings, Inc., Huntsville, AL (US)

(72) Inventors: Brandon Scott Dewberry, Huntsville, AL (US); Gert Frølund Pedersen, Storvorde (DK); Patrick Claus Friedrich Eggers, Lystrup (DK)

(73) Assignee: TDC Acquisition Holdings, Inc., Huntsville, AL (US)

( * ) Notice: Subject to any disclaimer, the term of this patent is extended or adjusted under 35 U.S.C. 154(b) by 0 days.

(21) Appl. No.: 14/479,236

(22) Filed: Sep. 5, 2014

(65) Prior Publication Data

US 2015/0029053 A1    Jan. 29, 2015

Related U.S. Application Data

(63) Continuation-in-part of application No. 13/872,030, filed on Apr. 26, 2013, and a continuation-in-part of application No. 13/745,700, filed on Jan. 18, 2013.

(60) Provisional application No. 61/874,963, filed on Sep. 6, 2013, provisional application No. 61/639,056, filed on Apr. 26, 2012, provisional application No. 61/587,912, filed on Jan. 18, 2012.

(51) Int. Cl.
*G01S 13/08*   (2006.01)
*G01S 11/02*   (2010.01)
*G01S 11/08*   (2006.01)

(52) U.S. Cl.
CPC . *G01S 11/02* (2013.01); *G01S 11/08* (2013.01)

(58) Field of Classification Search
CPC . F03D 11/0091; F05B 2270/17; G01S 17/08; G01S 2013/466; G01S 11/02

USPC .................. 342/118, 127, 132, 134
See application file for complete search history.

(56) References Cited

U.S. PATENT DOCUMENTS 3,068,473 A    12/1962 Muth et al.
3,213,449 A    10/1965 Kobayashi
(Continued)

FOREIGN PATENT DOCUMENTS

WO    WO 2012/069843    5/2012

OTHER PUBLICATIONS

US International Searching Authority, International Search Report and the Written Opinion of the International Searching Authority, for PCT/US2014/054438 to TDC Acquisition Holdings, Inc Dec. 22, 2014.

(Continued)

*Primary Examiner* — John B Sotomayor
*Assistant Examiner* — Marcus Windrich
(74) *Attorney, Agent, or Firm* — James Richards

(57) ABSTRACT

Determination of distance and/or position relative to one or more points by transmission of a wideband signal by a first antenna, reception of the transmitted wideband signal by a second antenna and comparison of the time delay between the transmitted and received signals. The first and second antennas are connected to a timer/processor unit. One or more of the first or second antennas is movable to an unknown position to be measured, but maintains connection to the timer/processor through a fixed or known delay communication link. The timer/processor contains a time base for generating the transmitted signal and an offset timer for measuring the time delay of the received signal. The received signal may be processed to determine a start time or leading edge that may resolve RF cycle and modulation bandwidth ambiguities and may allow positive determination of distance much shorter than a wavelength at the operation center frequency.

32 Claims, 17 Drawing Sheets

(56) References Cited

U.S. PATENT DOCUMENTS

| | | | |
|---|---|---|---|
| 3,376,504 | A | 4/1968 | Chick |
| 3,396,393 | A | 8/1968 | Wagner |
| 3,461,452 | A | 8/1969 | Welter |
| 4,112,421 | A | 9/1978 | Freeny, Jr. |
| 4,161,730 | A | 7/1979 | Anderson et al. |
| 4,315,260 | A | 2/1982 | Kupfer |
| 4,543,580 | A | 9/1985 | Bent et al. |
| 4,641,317 | A | 2/1987 | Fullerton |
| 4,743,906 | A | 5/1988 | Fullerton |
| 4,797,160 | A | 1/1989 | Koehler et al. |
| 4,813,057 | A | 3/1989 | Fullerton |
| 4,901,307 | A | 2/1990 | Gilhousen et al. |
| 4,916,429 | A | 4/1990 | Hicks et al. |
| 4,916,455 | A | 4/1990 | Bent et al. |
| 4,979,186 | A | 12/1990 | Fullerton |
| 5,216,429 | A | 6/1993 | Nakagawa |
| 5,247,311 | A | 9/1993 | Sobocinski |
| 5,363,108 | A | 11/1994 | Fullerton |
| 5,414,734 | A | 5/1995 | Marchetto et al. |
| 5,499,029 | A | 3/1996 | Bashforth et al. |
| 5,510,800 | A | 4/1996 | McEwan |
| 5,552,772 | A | 9/1996 | Janky et al. |
| 5,589,838 | A | 12/1996 | McEwan |
| 5,610,907 | A | 3/1997 | Barrett |
| 5,661,490 | A | 8/1997 | McEwan |
| 5,661,492 | A | 8/1997 | Shoap et al. |
| 5,666,662 | A | 9/1997 | Shibuya |
| 5,677,927 | A | 10/1997 | Fullerton et al. |
| 5,687,169 | A | 11/1997 | Fullerton et al. |
| 5,748,891 | A | 5/1998 | Fleming et al. |
| 5,764,696 | A | 6/1998 | Fullerton et al. |
| 5,796,366 | A | 8/1998 | Grebnev et al. |
| 5,812,081 | A | 9/1998 | Fullerton |
| 5,832,035 | A | 11/1998 | Fullerton et al. |
| 5,847,677 | A | 12/1998 | McCorkle |
| 5,859,612 | A | 1/1999 | Gilhousen |
| 5,912,644 | A | 6/1999 | Wang |
| 5,933,079 | A | 8/1999 | Frink |
| 5,952,956 | A | 9/1999 | Fullerton |
| 5,969,663 | A | 10/1999 | Fullerton et al. |
| 6,002,708 | A | 12/1999 | Fleming et al. |
| 6,040,800 | A | 3/2000 | Raith et al. |
| 6,054,950 | A | 4/2000 | Fontana |
| 6,104,337 | A | 8/2000 | Coutts et al. |
| 6,111,536 | A | 8/2000 | Richards et al. |
| 6,133,876 | A | 10/2000 | Fullerton et al. |
| 6,175,811 | B1 | 1/2001 | Tekinay |
| 6,177,903 | B1 | 1/2001 | Fullerton et al. |
| 6,295,019 | B1 | 9/2001 | Richards et al. |
| 6,300,903 | B1 | 10/2001 | Richards et al. |
| 6,304,623 | B1 | 10/2001 | Richards et al. |
| 6,421,389 | B1 | 7/2002 | Jett et al. |
| 6,483,461 | B1 | 11/2002 | Matheney et al. |
| 6,492,904 | B2 | 12/2002 | Richards |
| 6,501,393 | B1 | 12/2002 | Richards et al. |
| 6,556,621 | B1 | 4/2003 | Richards et al. |
| 6,571,089 | B1 | 5/2003 | Richards et al. |
| 6,577,691 | B2 | 6/2003 | Richards et al. |
| 6,614,384 | B2 | 9/2003 | Hall et al. |
| 6,700,538 | B1 | 3/2004 | Richards |
| 6,717,992 | B2 | 4/2004 | Cowie et al. |
| 6,748,040 | B1 | 6/2004 | Johnson et al. |
| 6,788,730 | B1 | 9/2004 | Richards et al. |
| 6,906,625 | B1 | 6/2005 | Taylor et al. |
| 6,959,031 | B2 | 10/2005 | Haynes et al. |
| 6,963,727 | B2 | 11/2005 | Shreve |
| 7,151,490 | B2 | 12/2006 | Richards |
| 7,230,980 | B2 | 6/2007 | Langford et al. |
| 7,426,233 | B2 | 9/2008 | Richards et al. |
| 7,436,876 | B2 | 10/2008 | Fisher et al. |
| 7,649,925 | B2 | 1/2010 | Fullerton et al. |
| 8,111,797 | B2 | 2/2012 | Barnes et al. |
| 8,511,177 | B1 | 8/2013 | Makaremi |
| 8,576,115 | B2 * | 11/2013 | Basten ............... G01B 7/042 340/435 |
| 2001/0053699 | A1 * | 12/2001 | McCrady ............. G01S 5/021 455/513 |
| 2005/0163265 | A1 * | 7/2005 | Gupta ................. H04L 5/06 375/343 |
| 2006/0106546 | A1 * | 5/2006 | Roberts ............... G01N 22/04 702/27 |
| 2008/0206055 | A1 * | 8/2008 | Godsk ................. F03D 1/0641 416/147 |
| 2009/0149132 | A1 | 6/2009 | Lefever et al. |
| 2010/0019953 | A1 | 1/2010 | Burcea |
| 2010/0021298 | A1 * | 1/2010 | Sandvad ............... F03D 7/047 416/1 |
| 2010/0241280 | A1 * | 9/2010 | Garcia Barace ...... F03D 7/0224 700/287 |
| 2010/0253569 | A1 * | 10/2010 | Stiesdal ............... F03D 11/0091 342/118 |
| 2011/0096954 | A1 | 4/2011 | Dahl |
| 2011/0150647 | A1 * | 6/2011 | Gierlich ............... F03D 11/0091 416/1 |
| 2011/0181455 | A1 * | 7/2011 | Vanuytven ........... G01S 13/44 342/27 |
| 2011/0184665 | A1 * | 7/2011 | Olesen ................ F03D 11/0091 702/42 |
| 2012/0035865 | A1 * | 2/2012 | Fujioka .............. F03D 11/0091 702/42 |

OTHER PUBLICATIONS

US International Searching Authority, Written Opinion of the International Searching Authority, for PCT/US2014/054438 to TDC Acquisition Holdings, Inc Jul. 27, 2015.

* cited by examiner

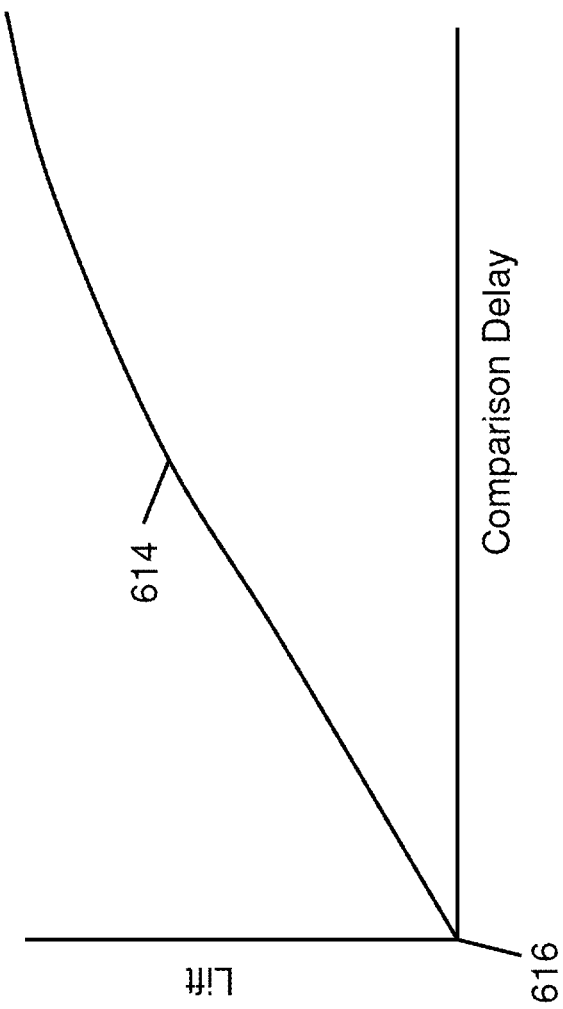

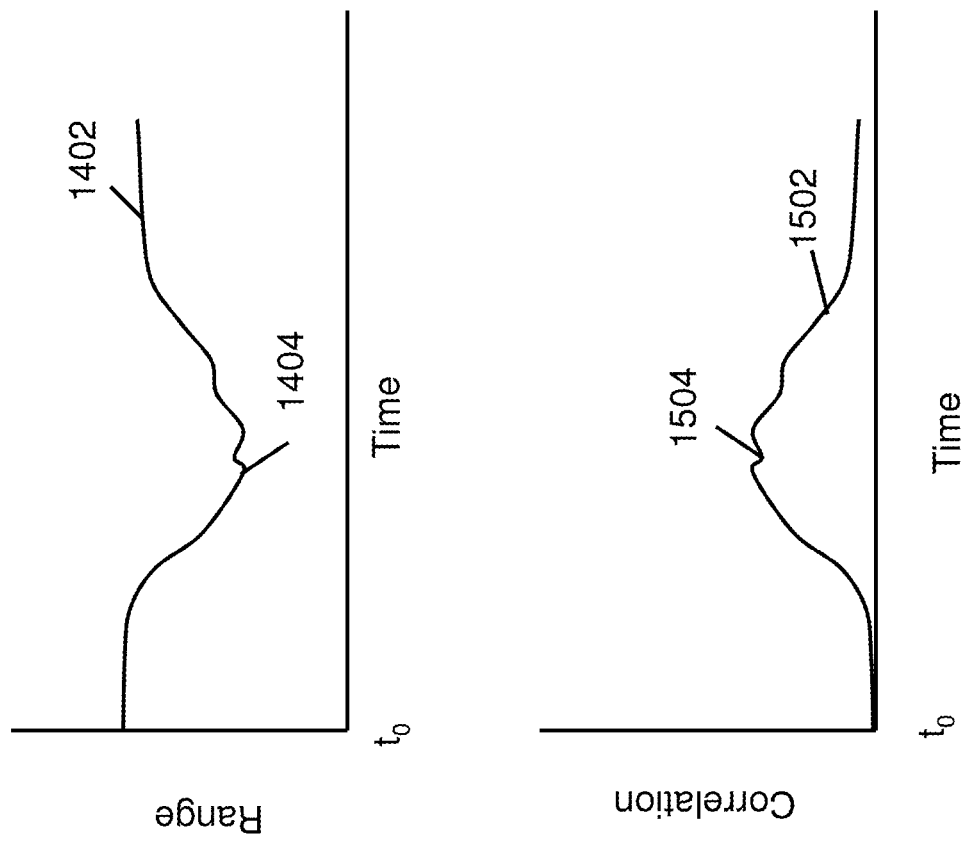

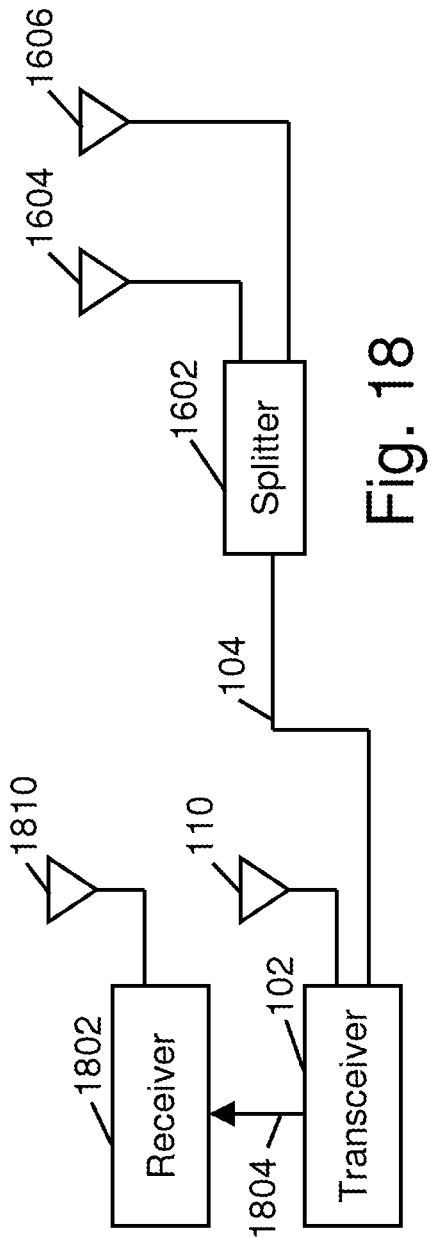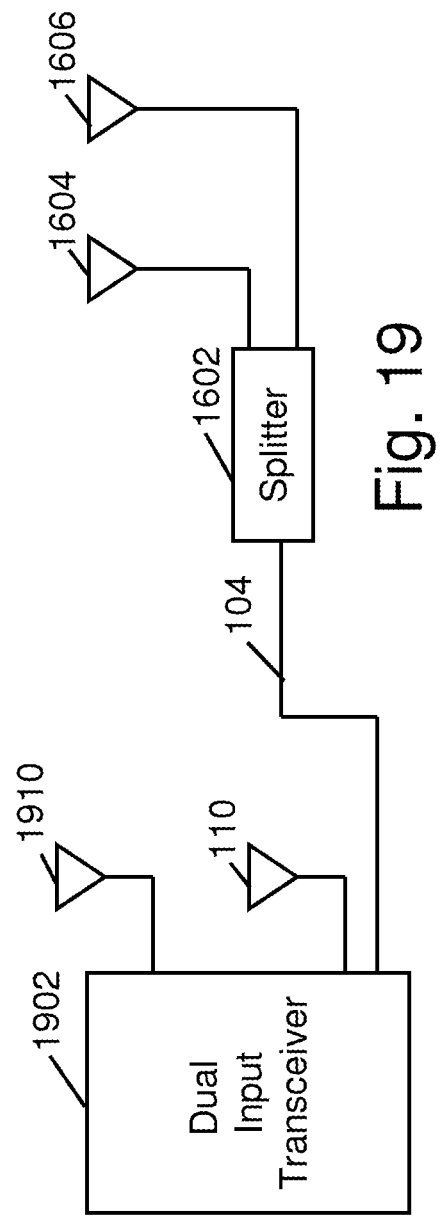

ONE WAY TIME OF FLIGHT DISTANCE MEASUREMENT

RELATED APPLICATIONS

This application claims the benefit under 35 USC 119(e) of U.S. provisional application 61/874,963 titled "One Way Time of Flight Distance Measurement", filed Sep. 6, 2013 by Dewberry et al., which is incorporated herein by reference in its entirety; this application is a continuation in part of application Ser. No. 13/872,030 titled "High Capacity Ranging Using Direct-path Signal Strength", filed Apr. 26, 2013 by Dewberry et al which is a non-provisional application of provisional application 61/639,056, titled: "High Capacity Ranging Network Using Ultra-Wideband Direct-path Pulse Signal Strength with Dynamic Recalibration", filed Apr. 26, 2012 by Dewberry; Ser. No. 13/872,030 is also a continuation in part of application Ser. No. 13/745,700 titled "Distance Measuring Quality Factor Using Signal Characterization", filed Jan. 18, 2013 by Dewberry et al., which is a nonprovisional of provisional application 61/587,912 titled "Distance Measuring Error Variance Using Signal Characterization", filed Jan. 18, 2012 by Dewberry et al. The above referenced patent documents are incorporated herein by reference in their entirety.

TECHNICAL FIELD

This disclosure pertains generally to the field of distance measurement by signal propagation, more particularly to high precision measurements for survey and industrial applications.

BACKGROUND

There is a need in construction, manufacturing, and survey to accurately measure distances through non metallic materials such as those used for building construction or for structural support in large mechanical devices. This invention can be either used for static survey, dynamic measurement of bending movement or flexure during test and operation or, when used in multitude, precision dynamic localization.

Direct measurement of link flexion and/or end effector location can enable use of lighter weight construction and faster dynamics in industrial processes.

BRIEF DESCRIPTION OF THE DISCLOSURE

The present disclosure pertains generally to a system and method for determination of distance and/or position relative to one or more points by transmission of a wideband signal by a first antenna, reception of the transmitted wideband signal by a second antenna and comparison of the time delay between the transmitted and received signals. The first and second antennas are connected to a timer/processor unit. One or more of the first or second antennas is movable to an unknown position or displacement to be measured, but maintains communication to the timer/processor through a communication link having a known or determinable, preferably stable time delay. The communication link may be typically a flexible transmission line, cable, fiber, or waveguide that maintains constant electrical length (time delay) in the presence of relative motion of the ends of the cable. Communication link may also include a dynamically measured RF, acoustic, or optical link. The timer/processor contains a time base for generating the transmitted signal and an offset timer for measuring the time delay of the received signal. The received signal may be processed to determine a precise time of arrival of signal energy or leading edge that resolves RF cycle and modulation bandwidth ambiguities and allows positive determination of distance much shorter than a single wavelength at the operation center frequency.

Wideband refers to a signal having a modulation bandwidth having a corresponding wavelength through the medium of more than one cycle over the distance between the two antennas. Thus, there may be a potential ambiguity as to which cycle of the modulation is being received. In addition, a limited modulation bandwidth contributes to difficulty or inability to determine which cycle of the RF signal is being received when determining time delay from the transmitted signal timing, especially in the presence of reflective surfaces. In accordance with one or more variations of the present system, the cycle ambiguities may be overcome, allowing resolution of distance to less than a wavelength of the RF center frequency through the medium.

In one variation, the receiver and offset timer are operated as a scanning receiver. The scanning receiver receives at a plurality of offset times over a range of offset times and generates a scan data set representing the received signal over the range of offset times. The offset time is measured from the time of the transmitted signal. The scan data set may be analyzed for characteristics related to precision timing and rejection of multipath signals. The scan data set may be analyzed for characteristics that enable identification of an earliest signal return time, by isolating the leading edge of a signal pulse. In addition the frequency-selective absorption characteristics of the propagation path, if known or measured, can be used to improve the accuracy of time of arrival estimate of the signal in complex non-line-of-sight RF channels.

The present system pertains to a radio technique by measurement of difference between time of transmission and time of arrival of an RF signal transmitted and received between antennas connected to the same base transceiver. In various embodiments the RF signal may be impulse ultra wideband (UWB) or frequency modulated continuos wave signals. The system could use other phenomenology as a basis such as optical or acoustic signaling. The system allows precise measurement of the time difference between transmission and reception measured by a single central set of transceiver electronics.

In the UWB embodiment the base transceiver transmits a RF pulse which is propagated through a short or long cable to the transmit antenna. The transmitted pulse may then propagate through any RF translucent material (such as air, wood, fiberboard, plastic, epoxy, etc.) in the environment. The environment may be clean or may include reflectors or absorbers producing a received signal with unknown amplitude in the presence of multipath clutter. The RF signal is captured by a receive antenna element which can move with the device under test or can be manually placed at a location and averaged for static distance survey. The receive antenna is connected to a cable which propagates the RF energy back to the emanating transceiver. The transceiver measures the time of arrival of the received signal relative to the time of transmission in the presence of the unknown, often frequency-selective attenuation and multipath clutter. The time difference between transmission and reception, less the cable lengths (found through calibration), multiplied by the speed of RF through the medium (often assumed constant) constitutes the distance measurement.

In one variation, the receiver is a correlation based scanning receiver configured to determine a leading edge of the received wide band signal to determine the time difference.

In one variation, the leading edge processing is set to reject multipath reflected signals that arrive delayed by a time due to their longer path length (relative to the direct path) through the RF channel. Thus reflections from nearby objects in the environment with a path length greater than ½ wavelength longer than the main path may be ignored and will have no effect on the distance measurements; whereas, narrow band signals would likely receive disturbances from these signals. For example, typical UWB with 2 GHz bandwidth its around 4.5 cm path length difference.

Various embodiments and features may include, but are not limited to:

1) A first antenna receives while the second antenna transmits, i.e., the transmit and receive functions may be reversed for a given geometry.
2) Optical or acoustic transmission and reception may be used rather than RF transmission and reception.
3) Narrowband RF modulation (i.e., frequency, phase, or amplitude modulation) may be used as transmit and received timing event. Narrower bandwidth, however, may lengthen timing, and distance errors.
4) Frequency Modulated Continuous Wave (FMCW) and 'chirp' transmission and reception may be used in place of impulse transmission.

In further variations, the system may include one transmit antenna and multiple simultaneous receive antennas at various locations for trilateration localization. In another variation of localization architecture one receive antenna and multiple transmit sources separated by time or code is used for trilateration localization.

In one variation, there is provided a range monitoring system, the system comprising:

a first antenna element to be located at the moving end of a device under test;

a second antenna element to be located towards the static end of the device under test, the first antenna element to be spaced from the second antenna element; and a transceiver, wherein the transceiver is operable to calculate the range/distance between the location of the first antenna and the location of the second antenna based on the time of flight of a signal transmitted between the first and second antennas, wherein the transmitter for the first antenna is to be located near the static reference point.

As the antenna driver or transmitter may be located spaced from the first antenna, this removes the need for relatively complicated circuitry to be provided towards the dynamic side of the measurement system. The time of flight is the one-way time of flight, i.e. the time for a signal to propagate through the measured RF channel from the first antenna and later to be received at the second antenna.

The transmitter may be coupled to the first antenna by a first (preferably wired) communications link, and the receiver is coupled to the second antenna by a second communications link, wherein the propagation delay of the first communications link and the propagation delay of the second communications link are known through previous calibration, or ignored if the delta time/distance from measurement to measurement is desired. The transceiver is operable to measure the time T between the sending of the signal from the transmitter and the arrival of the signal at the receiver, and/or the delta time dT from one measurement to the next.

Since reflected paths (multipath signals) are longer than a direct path the precise measurement of the time-of-arrival (TOA) of the first, most direct energy signal received, subtracting the static bias due to the wired link, and multiplied by the speed of propagation, produces an accurate distance measurement.

The transceiver may be further operable to subtract the propagation delay of the first communications link and the propagation delay of the second communications link from the measured time T to find the time of flight of the signal transmitted between the first and second antennas.

The transceiver may be further operable to multiply the time of flight of the signal transmitted between the first and second antennas by the speed of the transmitted signal to determine the distance between the first antenna and the second antenna.

The transmitter may be located adjacent to or in close proximity of the second antenna, to minimize the length of the transmission from the initial generation of the signal at the antenna driver to the eventual reception of the transmitted signal by the first antenna.

The transmitter and/or the receiver may be spaced from the location of the second antenna, to minimize the number of components and the power requirements of the range monitoring system to be positioned on the dynamic side of the distance measurement.

The system can also be beneficial when both sides of a flexible link are moving and the precise dynamic distance between end points indicates the flexure of the member.

The first and/or the second communications links may comprise a physical communications link, e.g. a transmission line or cable such as an RF cable, a coax cable, a waveguide, a stripline, a fiber optic, or other physical communications link.

The first cable and/or second cable or other communications link may be adapted for maintaining the fixed length in the presence of relative motion of said first antenna location relative to said second antenna location. The flexible cable may have slack, bends, curves, coils, or other techniques for allowing motion without changing the length, and thus functional RF propagation time, of the cable.

In one variation, the signal to be transmitted between the first and second antennas may comprise a pulse signal and the transceiver may send multiple pulses to form a higher fidelity received signal through coherent signal integration.

In one variation, the receiver, transmitter, signal processing, and control components may be provided as part of a single module, e.g. a transceiver module, a transmitter-receiver module. Additionally or alternatively, the signal processor and controller may be integrated with the receiver and/or the transmitter, or may be provided as part of a separate signal processing and control module.

The accuracy of the distance measurement is typically affected by the precision of synchronization between transmitter and receiver. By providing a single clock signal to synchronize the transmitter and the receiver, the accuracy of the measurement of the time between the trigger event initiating the signal to be transmitted by the first antenna and the measured event of the arrival of the signal at the receiver is increased. This leads to an increased accuracy of the range measurement between the first and second antennas. Preferably, the transmitter and the receiver are synchronized using a single clock crystal and a single event triggering circuit which can greatly reduce the effect of clock jitter on the system.

The single clock may be provided by any suitable module or circuit arranged to generate a synchronized precise event trigger for both transmission signal generation and reception signal sampling, e.g. a transmitter module, a receiver module, a transceiver module, a transmitter-receiver module, a controller module, a dedicated clock generator, etc.

In an alternative configuration, the locations of the receiver and the transmitter may be reversed, i.e. such that the second antenna located near the static side of the dynamic system is coupled to the transmitter to transmit the signal to the first antenna located towards the dynamic side, which is then sent via the first communications link to the receiver. The distance between the first and second antennas may then be calculated based on the time of flight of the signal transmitted from the second antenna to the first antenna. In a further aspect, the system may be configured such that the transmitter is provided as a switchable transmitter/receiver module, wherein the associated antenna may be configured to transmit or receive based on the module selection.

There is further provided a method for operating a range monitoring system as described to measure distance between two points of a device under test.

In particular, there is provided a method for range monitoring, the method comprising the steps of:

providing a first antenna towards the first location on a device under test;

providing a second antenna towards the second location on the device under test, the first antenna to be spaced from the second antenna;

providing a transmitter or a receiver or a transmitter-receiver or a transceiver associated with the first antenna;

transmitting a signal between the first antenna and the second antenna; and calculating the range between the location of the first antenna and the location of the second antenna based on the time of flight of the signal transmitted between the first and second antennas, wherein the transmitter or receiver or transmitter-receiver or transceiver associated with the first antenna is spaced from the first antenna, preferably located towards the first location on of the device under test, preferably located in the static side with ample volume and power source.

The transmitter is preferably connected over the longer wired communication channel to allow the transmitter to use higher power to overcome cable loss allowing maximized regulated transmit power at the transmit antenna.

The transmission side may also be chosen to be embedded inside the device under test in order to reduce free space emissions of the measurement system.

The method may further comprises the steps of:

providing a respective transmitter or receiver or transmitter-receiver or transceiver associated with the second antenna, and synchronizing the respective transmitter or receiver or transmitter-receiver or transceiver associated with the respective first and second antenna to a single clock.

In a further variation, the method may further comprise the step of:

applying a scanning receiver scan window to monitor for receipt of the signal.

The use of a scan window allows for the reduction of the time spent acquiring the received signals. Accordingly, there can be a reduction in the amount of data to be processed for the range monitoring system, resulting in a faster and/or more accurate range monitoring system. Such a scan window can be applied by a controller of the range monitoring system of a device as described above, or may be applied as part of a separate signal processing module.

The scan window may be of a configurable duration and sampling resolution. The scan window may be applied at a configurable start time after the transmit triggering event. The scan window start time and stop time may be configured based on the propagation delay of a communications link and based on knowledge of the maximum dynamics of the direct path energy delay based on the device under test or measured path.

The time resolution of the directly sampled scan window can be configured in order to maximize signal time of flight measurement accuracy while minimizing the duration required for each distance measurement. Small duration and fast update rates are particularly important in dynamic process control applications.

In a further aspect, multiple antennas along the device under test, combined with multiple scan windows, delayed in time to surround the return signal and with ample span to cover the full extent of the distance dynamic, will allow simultaneous distance measurements with a single transmission signal.

Calibration

For some applications, it may not be necessary to measure the total delay. It may be sufficient to measure only the relative change in delay between antennas. For example, a control system could operate successfully just by insuring that the time delay remains fixed. In other words the control system may provide a feedback control mechanism which operates responsive to the time delay measurement. If the time delay increases the control effects some change that reduces the delay. If the delay decreases then the control effects the opposite change.

Alternatively, it may be desired to know the absolute distance between antennas. In such a case it may be beneficial to know not just the travel time from one antenna to the other antenna but also the remaining system delays. For example, some of the system delays may include, but are not limited to:

the delay from the moment the wideband signal leaves the final output transistor and travel to the exit pin on the integrated package, the delay from the pin through printed circuit board traces, through filters, other components to the printed circuit board connection to the communications link, the delay from one end of the communications link to the base of the antenna, the delay from the base of the antenna to the phase center of the antenna, the objective measurement of delay from phase center of transmit antenna to phase center of the receive antenna, the delay from perceive antenna phase center to receive communications link, receive communications link to receive printed circuit board other electronic delays and software delays.

Many of the delays are so small as to be irrelevant. Some may be fixed. Some vary with time or temperature. The accuracy to which these signals are known determines the overall accuracy of the resultant antenna to antenna time delay measurement. Acoustic based systems may also have to compensate for changes in the speed of sound due to temperature and humidity.

The accuracy required to have a reasonably acceptable system may vary with application. Some systems might be successful by only generally knowing the magnitude of the delays. This could be accomplished through analysis or with a very simple one time calibration against a known distance. Other applications might require that the delay be known to high accuracy necessitating ever more elaborated calibration procedures including continuous on line calibration.

For example, one method of continuous calibration may involve using transceivers for both transmit and receive antennas in conjunction with combiners. For example a the transmit signal could exit the transmitter through a circulator such that the output of the circulator would drive the communications link and any reflections from impedance mismatches in the system would return to the circulator and to the local receiver. This local receiver could then measure the time offset of returning reflections and thereby measure the time delay from transmission of the transmit pulse and reception of a reflection from the base of the transmit antenna. An analogous approach could be used on the receive antenna.

In a further aspect, there is provided a method of calibrating a range monitoring system for a material or device, the system comprising:

providing an antenna at a first location in a device;

providing a communications link (typically, an RF transmission line) extending from the first location to a second location;

sending a signal to be transmitted by the antenna along the communications link from the second location to the antenna at the first location;

at the second location, receiving the signal from the antenna along the communications link due to partial reflection of the energy at the antenna at the first location; and calibrating the range monitoring system based on the signal received at the second location.

In one variation, the step of calibrating may comprise determining a propagation delay of the communications link for a signal sent along the communications link. The calibration may be performed to account for bending effects and/or temperature effects on a communications link provided within a dynamic construction.

In one variation, the calibration method may be performed as a single initial calibration process. Additionally or alternatively, the calibration method may be performed as part of an ongoing range monitoring process, e.g. as part of a dynamic re-calibration technique performed during device operation.

Often, in dynamic feedback control processes, the change in distance between measurements is needed rather than absolute distance. These applications typically do not require absolute calibration.

In one variation the calibration may require assessment of the frequency-selective attenuation of the signal through device under test in order to account for manufacturing variations.

In another variation the calibration may require assessment of a changing RF direct path and reflective channel associated with propagating through a dynamic flexible material or structure.

This method supports assessment at a number of dynamic locations at any point along the length of the device, or geometrically diverse locations in support of a localizing system.

Wind Turbine Blade Sensing and Control

In one variation, there is provided a range monitoring system for a wind turbine blade, the system comprising:

a first antenna to be located towards the tip end of a wind turbine blade (having an associated transmitter);

a second antenna to be located towards the root end of a wind turbine blade (having an associated receiver), said first antenna to be spaced from said second antenna; and a controller, wherein said controller is operable to calculate the range/distance between the location of the first antenna and the location of the second antenna based on the time of flight of a signal transmitted between said first and second antennas, wherein the transmitter for said first antenna is to be located towards the root end of the wind turbine blade.

There is further provided a method for operating a range monitoring system as described to measure distance between multiple point in a wind turbine blade.

In particular, there is provided a method for wind turbine blade range monitoring comprising the steps of:

providing a first antenna at the root end of a wind turbine blade;

providing multiple antennas at different positions along the wind turbine;

connecting the multiple antennas to a single shared communications link;

providing a receiver at the first antenna and providing a transmitter for the shared communications link; and conveying the transmit signal from the transmitter to the communications link to each of the multiple antennas to the synchronized receiver such that the receiver can calculate the relative or absolute time delay between the each transmit antenna to the received antenna. As the antenna driver or transmitter may be located spaced from the first antenna (e.g., within the root half of the blade), this removes the need for relatively complicated circuitry to be provided towards the tip end of the blade at the location of the first antenna, thereby simplifying the lightning protection circuitry required. Additionally, this eliminates the problem of providing a remote power supply at an outboard location of a wind turbine blade for the transmission of a signal from the first antenna. The time of flight will be understood as the one-way time of flight, i.e. the time for a signal to be transmitted from a first antenna to be received at a second antenna.

Preferably, the transmitter and/or the receiver are spaced from the location of the second antenna, e.g. within a wind turbine hub or nacelle, to minimize the number of components of the range monitoring system to be positioned within the interior of the wind turbine blade.

In an alternative configuration, the locations of the receiver and the transmitter may be reversed, i.e. such that the second antenna located near the root end of the blade, i.e., within the root half of the blade, is coupled to the transmitter to transmit the signal to the first antenna located towards the tip end of the blade, i.e., within the tip half of the blade, which is then sent via the first communications link to the receiver. The distance between the first and second antennas may then be calculated based on the time of flight of the signal transmitted from the second antenna to the first antenna. In a further aspect, the system may be configured such that the transmitter is provided as a switchable transmitter/receiver module, wherein the associated antenna may be configured to transmit or receive based on the module selection.

There is also provided a wind turbine blade having a range monitoring system as described. There is further provided a wind turbine having at least one such wind turbine blade.

There is further provided a method for operating a range monitoring system as described to measure distance between two points of a wind turbine blade.

In one variation utilizing a scanning receiver, the scanning receiver sample rate may permit decay of multipath between each sample, i.e., sample time interval may be greater than the reflection time for nearby environmental features. For example, a wind blade system with a transmit antenna in the tip and a receive antenna at the root of a blade may receive a reflection off of the tower. The sample time interval may allow the reflection from the tower to decay before beginning another sample. Further, each scanning receiver sample, for example, may comprise the integration of multiple pulses from an impulse wideband signal, or multiple chips forming a symbol using other wideband techniques.

In particular, there is provided a method for wind turbine blade range monitoring, the method comprising the steps of:

providing a first antenna towards the tip end of a wind turbine blade;

providing a second antenna towards the root end of the wind turbine blade, said first antenna to be spaced from said second antenna;

providing a transmitter or a receiver or a transmitter-receiver or a transceiver associated with said first antenna;

transmitting a signal between said first antenna and said second antenna; and calculating the range between the location of the first antenna and the location of the second antenna based on the time of flight of the signal transmitted between said first and second antennas, wherein said transmitter or receiver or transmitter-receiver or transceiver associated with said first antenna is spaced from said first antenna, preferably located towards the root end of the wind turbine blade, preferably located in the hub of a wind turbine.

Preferably, the method further comprises the steps of:

providing a respective transmitter or receiver or transmitter-receiver or transceiver associated with said second antenna; and synchronizing the respective transmitter or receiver or transmitter-receiver or transceiver associated with the respective first and second antenna to a single clock.

In a further aspect, there is provided a method of calibrating a range monitoring system for a wind turbine blade, the system comprising:

providing an antenna at a first location in a wind turbine blade;

providing a communications link extending from said first location to a second location;

sending a signal to be transmitted by said antenna along said communications link from said second location to the antenna at said first location;

at said second location, receiving a reflection of said signal from said antenna along said communications link; and calibrating said range monitoring system based on the reflected signal received at said second location.

It will be understood that the step of calibrating may comprise determining a propagation delay of said communications link for a signal sent along said communications link. The calibration may be performed to account for bending effects and/or temperature effects on a communications link provided within a wind turbine blade. Preferably, the signal is a simple pulse signal.

It will be understood that the calibration method may be performed as a one time calibration process, for example during installation of a range monitoring system on a wind turbine. Additionally or alternatively, the calibration method may be performed as part of an ongoing range monitoring process, e.g. as part of a dynamic re-calibration technique performed during wind turbine operation. For example, the steps of such a re-calibration method may be performed as part of a range monitoring method as described above, wherein steps for re-calibration of the range monitoring system are carried out after a defined number of range measurements, e.g. for every 10, 20, 100, 1000, etc. instances of range monitoring measurements, a re-calibration procedure is performed. Calibration typically takes place when the system is static and the distance can be estimated through other methods.

Dynamic calibration can be performed if the device under test, by its nature, has a quiescent state or average/relaxed distance. A running average and/or median of the time of flight measure through the measurement system can be used as a dynamic calibration measurement.

If the monitoring/control system has an alternate means for determining quiescence then it could trigger the RF measurement system to recalibrate during these modes. For instance the windblade control system actively monitors the rotational speed of the windmill. This system typically adjusts the pitch of the blade in order to keep the rotational speed at a controlled setpoint. Often a model of flexure is used to estimate the bend of the windblade as a function of speed and pitch. This monitoring system could provide a calibration event signal as well as an estimated distance between measurement points to allow for in-line recalibration.

It will be understood that the first location may be any point along the length of a wind turbine blade, e.g. towards a blade tip end, towards a blade root end. It will be understood that the second location may be provided at the root end of a wind turbine blade, in a wind turbine hub, in a wind turbine nacelle.

In addition, any number of antennas at various lengths along the blade can be used as multiple measurement points down the length of the wind blade for dynamic estimation of complex flexure.

Also described is a method for sensing a lift value for a wind turbine blade comprising: measuring a windward time of flight for a signal transmitted between a first pair of antennas, at least one of the first pair of antennas disposed on a windward (high pressure) side of said wind blade, said windward time of flight responsive to a bending of the wind blade due to aerodynamic loading; measuring a leeward (low pressure) time of flight for a signal transmitted between a second pair of antennas, at least one of the second pair of antennas disposed on a leeward side of the wind blade; and determining the lift value based on comparing the windward time of flight to the leeward time of flight.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

FIG. 6B depicts an exemplary function of lift vs. comparison delay as measured in FIG. 6A.

FIG. 14 depicts a graph of the distance from handle to club vs. time for the application of FIG. 12.

FIG. 15 depicts a graph of acceleration over time.

FIG. 18 illustrates a further exemplary system using two receive antennas and two transmit antennas.

FIG. 19 illustrates a further exemplary system using two receive antennas and two transmit antennas.

UWB BASICS

Figure 1:
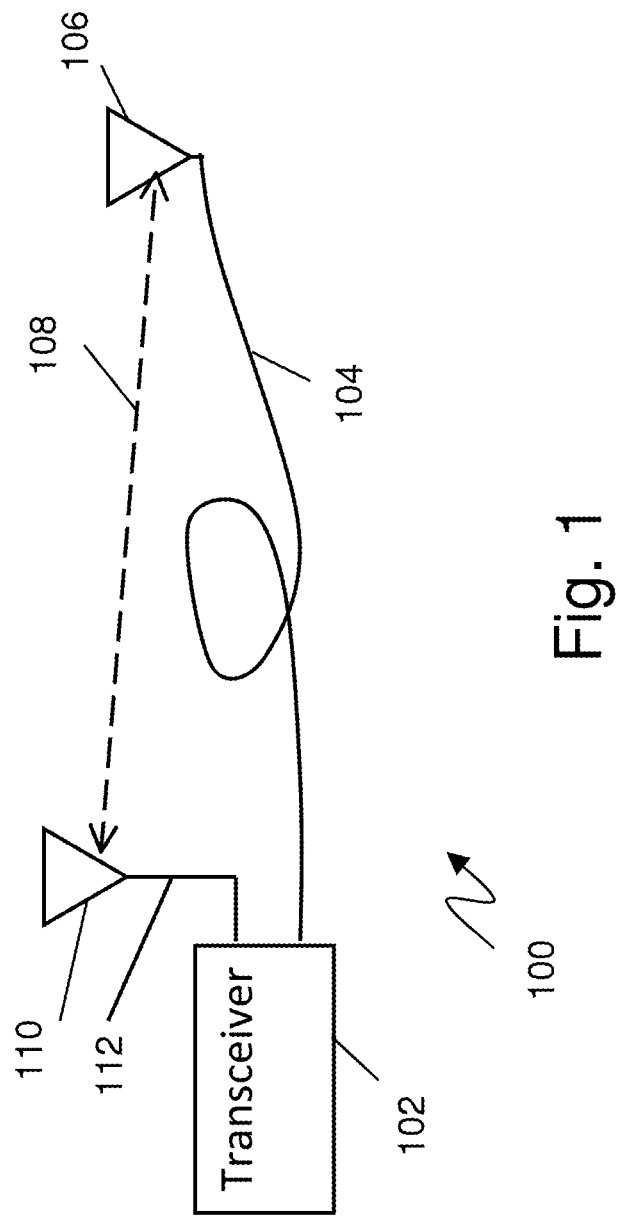
FIG. 1 is an exemplary block diagram of a distance measuring system in accordance with the present disclosure.

The following is an overview of ultra wideband (UWB) radio as an aid in understanding the benefits of the present invention.

Ultra Wideband is an emerging RF technology with significant benefits in communications, radar, positioning and sensing applications. In 2002, the Federal Communications Commission (FCC) recognized these potential benefits to the consumer and issued the first rulemaking enabling the commercial sale and use of products based on Ultra Wideband technology in the United States of America. The FCC adopted a definition of Ultra Wideband to be a signal that occupies a fractional bandwidth of at least 0.25, or 400 MHz bandwidth at any center frequency. The fractional bandwidth is more precisely defined as:

$$FBW = \frac{2(f_h - f_l)}{f_h + f_l},$$

where FBW is the fractional bandwidth, $f_h$ is the upper band edge and $f_l$ is the lower band edge, the band edges being defined as the 10 dB down point in spectral density.

There are many approaches to UWB including impulse radio, direct sequence CDMA, ultra wideband noise radio, direct modulation of ultra high-speed data, and other methods. The present disclosure includes ultra wideband pulse radio (longer pulse than an impulse, but shorter than narrowband) and may have significant application there, but may have potential benefit and application beyond impulse radio to other forms of ultra wideband and beyond ultra wideband to conventional radio systems as well. Nonetheless, it is useful to describe exemplary variations in relation to impulse radio to understand the basics and then expand the description to the extensions of the technology.

Impulse radio has been described in a series of patents, including U.S. Pat. No. 4,641,317 (issued Feb. 3, 1987), U.S. Pat. No. 4,813,057 (issued Mar. 14, 1989), U.S. Pat. No. 4,979,186 (issued Dec. 18, 1990), and U.S. Pat. No. 5,363,108 (issued Nov. 8, 1994) to Larry W. Fullerton. A second generation of impulse radio patents includes U.S. Pat. No. 5,677,927 (issued Oct. 14, 1997), U.S. Pat. No. 5,687,169 (issued Nov. 11, 1997), U.S. Pat. No. 5,764,696 (issued Jun. 9, 1998), U.S. Pat. No. 5,832,035 (issued Nov. 3, 1998), and U.S. Pat. No. 5,969,663 (issued Oct. 19, 1999) to Fullerton et al., and U.S. Pat. No. 5,812,081 (issued Sep. 22, 1998), and U.S. Pat. No. 5,952,956 (issued Sep. 14, 1999) to Fullerton, which are incorporated herein by reference.

Uses of impulse radio systems are described in U.S. Pat. No. 6,177,903 (issued Jan. 23, 2001) titled, "System and Method for Intrusion Detection using a Time Domain Radar Array", U.S. Pat. No. 6,218,979 (issued Apr. 17, 2001) titled "Wide Area Time Domain Radar Array", and U.S. Pat. No. 6,614,384 (issued Sep. 2, 2003), which are incorporated herein by reference.

Additional details on pulser circuits may be found in U.S. patent application Ser. No. 09/537,692 Titled: "Apparatus, System and Method for Flip Modulation in an Impulse Radio Communications System," filed Mar. 29, 2000, by Fullerton et al., and application Ser. No. 10/712,271 titled: "A Bi-Phase Modulator for Ultra Wideband Signals", filed Sep. 30, 2004, by Fitzpatrick et al., which are incorporated herein by reference.

Additional details on receiver circuits may be found in U.S. Pat. No. 6,421,389 titled "Baseband Signal Converter Device for a Wideband Impulse Radio Receiver" issued Jul. 16, 2002 to Jett et al. Further UWB power saving techniques may be found in U.S. Pat. No. 6,492,904 titled "Method and system for coordinating timing among ultrawideband transmissions" issued Dec. 10, 2002 to Richards, and U.S. Pat. No. 6,571,089 titled: "Method and apparatus for moderating interference while effecting impulse radio wireless control of equipment," issued May 27, 2003 to Richards et al. and U.S. patent application titled: "System And Method For Processing Signals In UWB Communications," Ser. No. 10/712,269, filed on 14 Nov. 2003 by Brethour et al. All of the above cited US patents and US patent applications are hereby incorporated herein by reference in their entirety.

Timing coordination among UWB transmissions is further described in U.S. Pat. No. 6,492,904, titled: "Method and System for Coordinating Timing Among Ultrawideband Transmissions," issued Dec. 10, 2002 to Richards. Security systems utilizing timing are further described in U.S. Pat. No. 6,614,384, titled: "System and Method for Detecting an Intruder Using Impulse Radio Technology," issued Sep. 2, 2003 to Hall et al. and U.S. Pat. No. 6,177,903, titled: "System and Method for Intrusion Detection Using a Time Domain Radar Array," issued Jan. 23, 2001 to Fullerton et al. Object position location is further explained in U.S. Pat. No. 6,300,903, titled: "System and Method for Person or Object Position Location Utilizing Impulse Radio," issued Oct. 9, 2001, to Richards et al. Position determination is further explained in U.S. Pat. No. 6,133,876, titled: "System and Method for Position Determination by Impulse Radio," issued Oct. 17, 2000 to Fullerton et al. Functional control based on position information is further described in U.S. patent application Ser. No. 09/511,991, titled "System and Method for Information Assimilation and Functionality Control Based on Positioning Information Obtained by Impulse Radio Techniques," filed Feb. 24, 2000 by Taylor et al. Delay coding techniques are further described in U.S. patent application Ser. No. 09/878,923, titled: "System and Method for Applying Delay Codes to Pulse Train Signals," filed Jun. 13, 2001 by Roberts and U.S. Pat. No. 6,878,730 titled "Method and apparatus for applying codes having pre-defined properties," issued Sep. 7, 2004 to Richards et al. The above listed US patents and US patent applications are hereby incorporated herein by reference in their entirety.

Distance measurement is further described in U.S. Pat. No. 6,133,876 Titled: "System and Method for Position Determination By Impulse Radio," issued Oct. 17, 2000 to Fullerton et al, and U.S. Pat. No. 6,295,019 Titled: "System and Method for Distance Measurement by Inphase and Quadrature Signals in a Radio System" issued Sep. 25, 2001 to Richards et al., and U.S. Pat. No. 6,700,538 titled "System and method for estimating separation distance between impulse radios using impulse signal amplitude", issued Mar. 2, 2004 to Richards. The above listed US patents and US patent applications are hereby incorporated herein by reference in their entirety.

Full duplex communications is further described in U.S. Pat. No. 5,687,169, titled "Full Duplex Ultrawide-Band Communication System and Method," issued Nov. 11, 1997 to Fullerton.

Precision timing generators are further described in U.S. Pat. No. 6,304,623 titled "Precision Timing Generator System and Method," issued Oct. 16, 2001 to Richards et al., and U.S. Pat. No. 6,577,691 titled "Precision timing generator apparatus and associated methods," issued Jun. 10, 2003 to Richards et al.

Acquisition is further described in U.S. Pat. No. 6,556,621 titled "System for Fast Lock and Acquisition of Ultra-Wideband Signals," issued Apr. 29, 2003 to Richards et al., and U.S. Pat. No. 8,11,797 titled: "Enhanced system and method for detecting the leading edge of a waveform", issued Feb. 7, 2012 to Barnes et al.

All of the above mentioned US patents and patent applications are hereby incorporated herein by reference in their entirety.

DETAILED DESCRIPTION OF THE EXEMPLARY EMBODIMENTS

FIG. 1 is an exemplary block diagram of a distance measuring system in accordance with the present disclosure. Referring to FIG. 1, a transceiver 102 is coupled to a first antenna 106 and a second antenna 110 for measuring distance 108 between the two antennas 106, 110. Antenna 106 may typically be a movable or mobile antenna connected to the transceiver through relatively long cable 104, whereas antenna 110 may typically be connected to the receiver through optional cable 112. Antenna 106 may preferably be connected to the transmit portion of transceiver 102. By connecting the longer cable to the transmit side allows the transmit power to be increased to overcome cable loss while maintaining specified transmit field strength at the antenna. In addition this configuration allows the transmit antenna to be placed inside the device under test promoting increased transmit power while maintaining specified transmit field strength at the surface of the device under test.

More generally, cable 104 may be a communication link 104 having a known or determinable, preferably stable time delay. The communication link 104 may communicate the transmitted signal from the transmitter 102 to the antenna 106. Alternatively, timing signals may be communicated by the communication link 104 and the transmit signal may be generated proximal to the antenna 106 end of communication link 104.

Alternatively, the transmit and receive connections may be reversed, i.e., antenna 106 for receive and antenna 110 for transmit. In a further alternative, the cables 112 and 104 may be any desired length and either or both antennas may be moving or fixed according to the application. In some applications, the receive antenna may be a directive antenna to increase range and interference rejection without increasing radiated power.

In operation, a signal is transmitted through cable 104 to antenna 106. The transmitted signal propagates through path 108 to receive antenna 110 and cable 112 to the receiver. The receiver is configured to measure the time difference between the transmission and reception of the signal. Cable delays are subtracted from the total delay to determine the propagation delay and thus determine the distance through path 108.

Typically, the cable length is constant for variations in temperature or spooling; however, for special cases or for greater accuracy, temperature and stress may be corrected by measuring temperature and/or stress and determining a correction factor based on experimental or theoretical cable characterization.

In one variation, the transceiver is an Ultrawideband impulse transceiver and the received signal is processed using a time scanning receiver to determine a channel response waveform. The channel response waveform is then processed to find a leading edge of the pulse signal. Leading edge timing is then used to precisely determine received signal timing. The leading edge signal results from the shortest direct propagation path between the two antennas. Multipath signals will be delayed from the direct path and thus will be rejected by the receiver processing. Thus, the system of FIG. 1 can deliver precise distance measurements in the presence of multipath interference including static and dynamic multipath—a desirable characteristic for dynamic systems.

Figure 2:
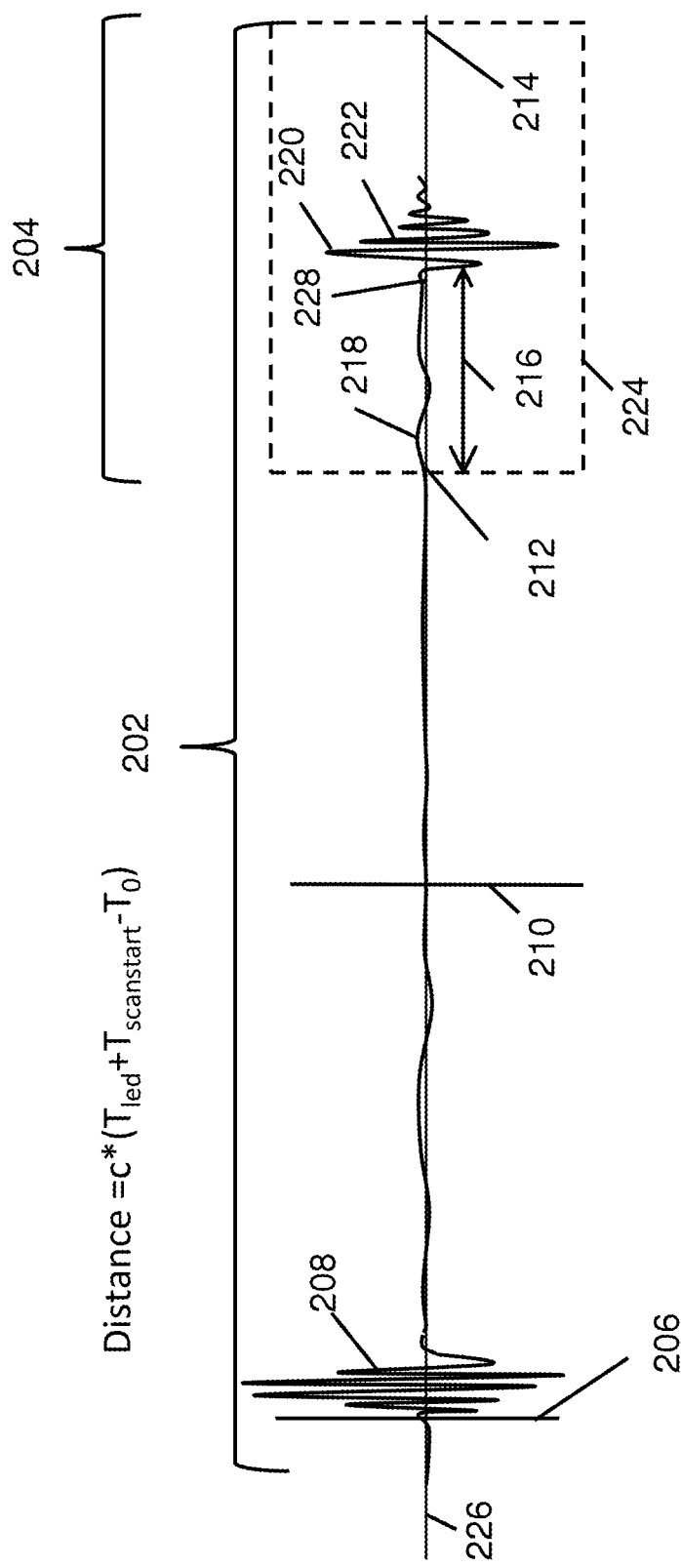
FIG. 2 is an exemplary timing diagram and scan waveform illustrating several features of the received signal in the distance measurement system.

FIG. 2 is an exemplary timing diagram and scan waveform produced by the scanning receiver illustrating several features of the distance measurement system of FIG. 1. Referring to FIG. 2, a scan waveform for an entire transmit to receive time is shown as interval 202 along time axis 226. A shortened scan window is shown as interval 204. A pulse is transmitted at time 206. The transmission typically creates a disturbance in the received signal due to stray coupling internal to the transceiver 208. The transmitted pulse propagates through the wired communications channel 104 and reaches the transmit antenna 106 at time 210. The signal the propagates through the medium (air and/or RF translucent material) and is then received through the receive antenna 110 and receiver.

The receiver may define a scan window 224 over interval 204 for faster processing during repetitive measurements. The window has a start time 212 and end time 214 which span the maximum dynamic distance of the device under test. As shown the pulse signal 222 is received in the window 204. The signal 222 has a peak 220, which may be used to determine signal strength. The first noise 218 before the pulse 222 may be used to determine a leading edge threshold. The scan resolution of the window may also be adjusted to optimize leading edge accuracy while minimizing scanning and processing time.

The distance may be calculated as follows:

$$\text{Distance} = c^*(T_{led} + T_{scanstart} - T_{calib} - T_0),$$

Where,

Distance is the distance 108 between the antennas, c is the speed of light (or sound) in the medium, $T_{led}$ is the time difference from the start of the scan window 212 to the detection of the leading edge (the first, most direct energy path) 228, $T_{scanstart}$ is the time of the start of the scan window 212, $T_{calib}$ is the calibrated time delay between $T_{scanstart}$ and $T_0$, encompassing the system electrical delays common in radio electronics as well as the propagation delay through the receive antenna and cable, and $T_O$ is the time of the time of transmission from the transmit antenna 206.

Figure 3:
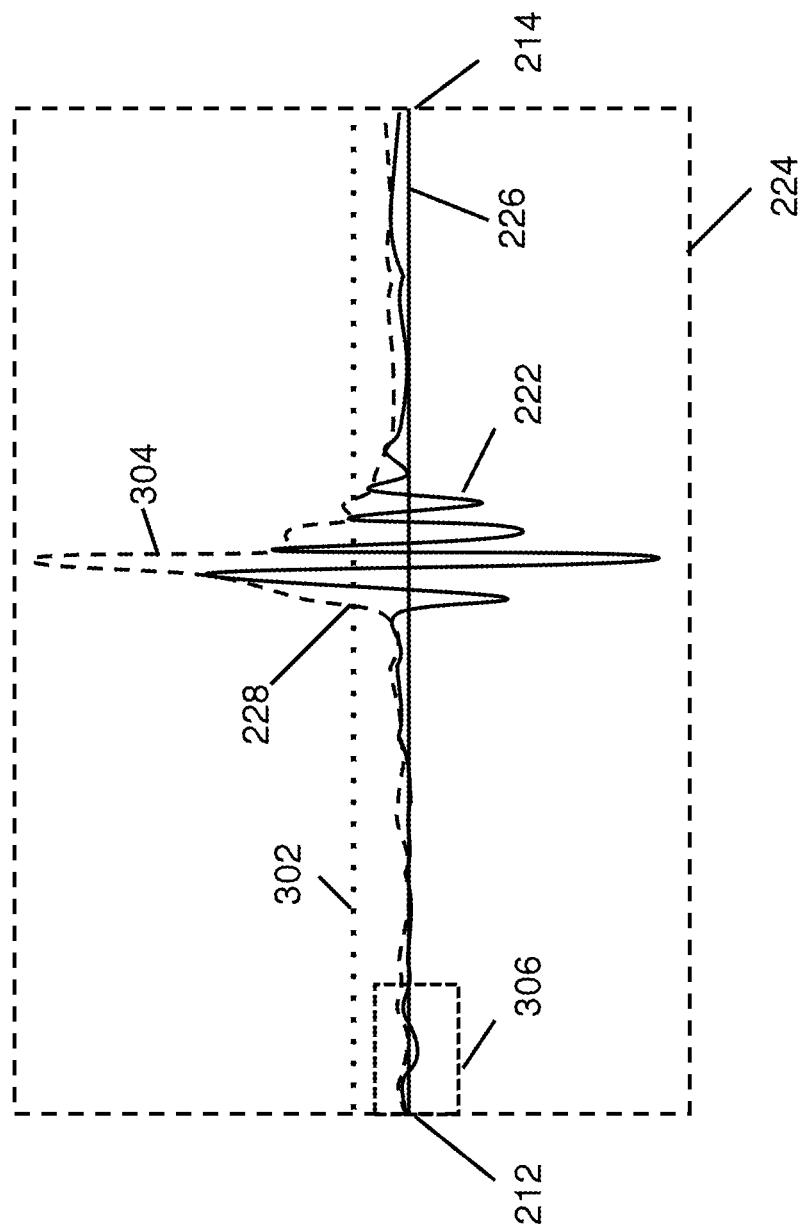
FIG. 3 shows an exemplary scan together with processing features for identifying leading edge signal time of arrival.

FIG. 3 shows an exemplary scan together with processing features for identifying leading edge timing. FIG. 3 shows greater detail in the processing window 224 of FIG. 2. Referring to FIG. 3, a noise measurement interval is used to determine a noise level before arrival of the pulse 222. The average noise may be used to establish a threshold for determine leading edge. The threshold 302 may be, for example three times the RMS noise based on RMS noise in the noise interval 306. The received pulse 222 is shown with an absolute value envelope 304. The leading edge time 228 is determined as the time the received pulse envelope 304 exceeds the threshold 302.

The threshold 302 may be found by multiplying a background noise measurement by a predetermined factor. Typically, the background noise may be found by measuring noise in a noise window 306 at the start of the scan window. The noise average or RMS value may be determined and the noise value, assumed to be constant radio noise, may be multiplied by a factor, for example three, to determine the leading edge threshold 302. Experiment may be used to find the best factor.

The envelope 304 may be calculated as the absolute value of the signal 222. Alternatively the absolute value may be filtered. Alternatively, a Hilbert transform of the signal may be used. Other techniques may be used to provide an estimate of the envelope of the signal.

Another technique uses matched filter(s) based on the transmitted signal modified through the transmission channel to estimate the time of arrival of the received signal. In this technique one or more preconfigured signal templates, based on frequency-selective dynamic RF channel properties, can be correlated against the received signal. A full process will determine correlation at all phases between received signal and template(s). The template with highest global correlation would indicate the leading edge as the phase offset with highest correlation coefficient. This technique could also be used to further indicate the dynamic configuration and/or material properties of the interposed RF channel.

This system uses Channel Impulse Response (CIR) analysis of the signal to maximize assessment of the channel and the accuracy of measurement. Often providing a reliable accuracy assessment accompanying each measurement can be an important feature of recursive optimal weighted localization filters.

Figure 4:
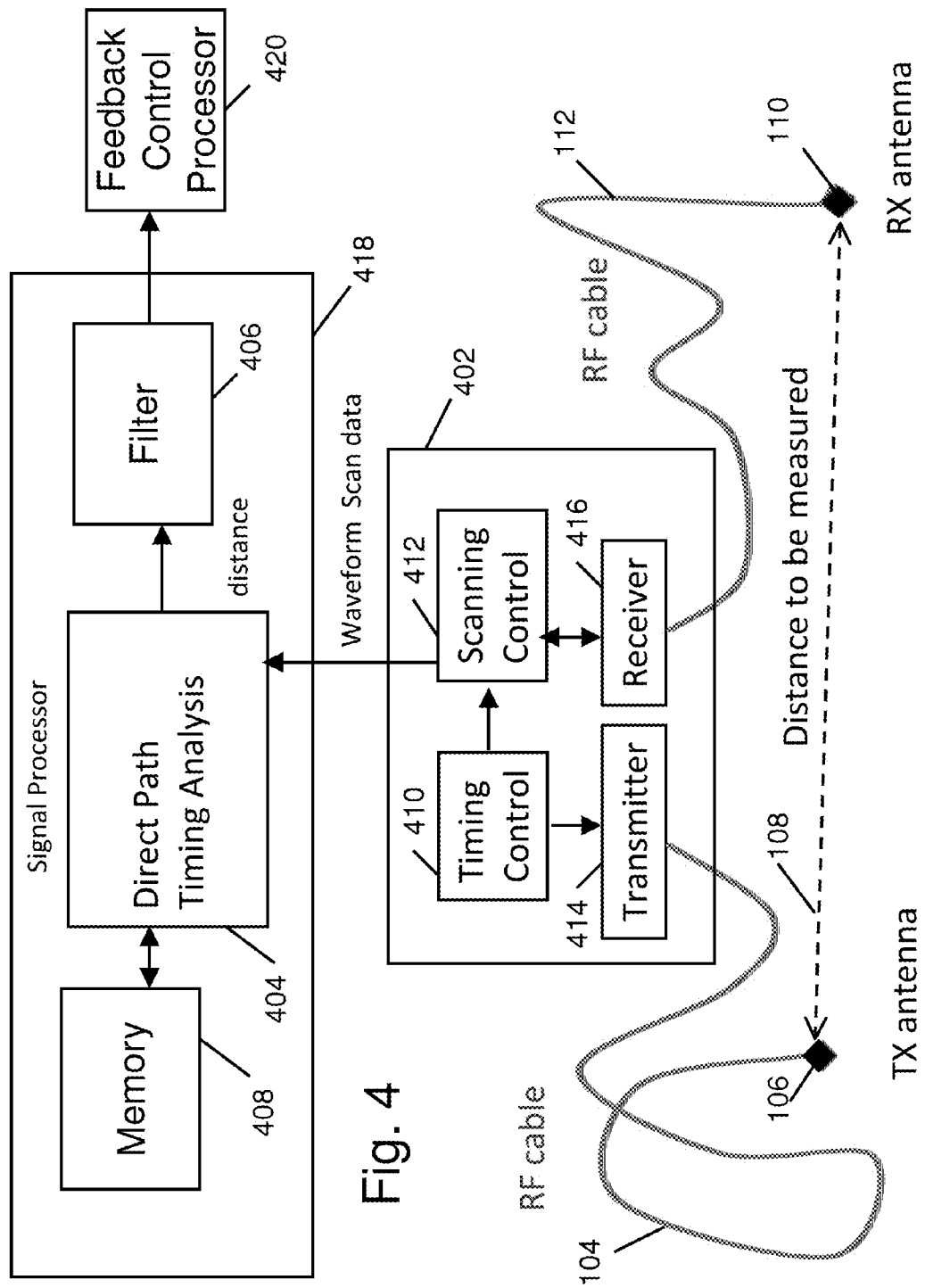
FIG. 4 illustrates an exemplary system block diagram including timing and scanning control of the scanning receiver portion of the transceiver with separate signal processor and controller components.

FIG. 4 illustrates an exemplary system block diagram including timing control of the scanning receiver portion of the transceiver. Referring to FIG. 4, the transceiver comprises an RF and timing section 402 and a processing section 404, 406, 408. The processing section comprises a processor 404 for processing scan data with associated memory 408. The distance result may optionally be filtered by a filter 406. The filter may be a low pass filter, band pass filter, Kalman filter or other filter typically used for navigation or tracking. These filters utilize the recent history of time of flight or distance location over time to increase the reliability of each new assessment.

In operation, the timing control 410 provides a precise timing signal structure for triggering the transmitter 414 and scanning receiver 412, 416. The timing control 410 uses a common timebase, typically a crystal based reference oscillator, to provide all timing signals, thereby keeping all timing signals synchronous. The transmitter 414 transmits a sequence of pulses. Typically the sequence of pulses may be coded in time and/or polarity to spread the spectrum. Different codes may also provide channel separation among several units operating in close proximity. Timing control 410 also provides timing signals for the scanning receiver. The scanning receiver builds a data set of received signal samples where the samples are delayed over a range of delays. Typically one pulse may result in one or only a few samples, so many pulses are required to build the full scan. For example, a scan of a time interval of 100 ns may sample each 50 ps. Thus, 20,000 samples may be required to build the full scan. So, for each pulse transmitted, a corresponding incrementally offset sample is taken by the receiver. The resulting signal value is recorded in a sequential memory array to produce a scan data set, or "scan". FIG. 2 and FIG. 3 show exemplary scans.

The timing analysis processor 404 performs the waveform analysis on the scan data to determine the background noise, leading edge threshold, leading edge time, signal strength and other related calculations. The resulting distance measurement may then be filtered for better stability and robustness, especially in the presence of noise. The timing analysis block 404 may also produce a measurement confidence value based on signal strength to aid the filter 406.

In some embodiments a process feedback control block may be added to utilize the distance measurement or the change in distance through the scan history. This block may also operate directly on the scan leading edge time of arrival. A multitude of transceivers with associated signal processing elements may be associated with one control block for multidimensional localization.

Alternatively storage, mean and outlier filters, and user display could be integrated for precision survey applications.

Calibration

When the system is first placed into operation, various characteristics, in particular, time delays may be unknown. Thus, it may be beneficial to perform a calibration to establish fixed system delays, such as cable delays, trigger and threshold delays. One exemplary calibration process may be as follows:

1) Establish the system in operation with a known distance between the transmitter antenna and receive antenna.
2) Record the mean distance measurement, systemic (bias) error and random (standard deviation) error.
3) Initiate calibration mode in the transceiver.
4) Store the bias error as a fixed offset factor in the calibration setup.
5) Store the random error as a quality factor during this configuration (such as bending configuration) of the device under test.
6) Return to operation mode and verify the correct reported distance measurement.
7) Repeat as necessary.

Applications

This technique is appropriate for any area requiring precision (~1 mm) measurement at limited distances, where a cable can be run between the two points of interest. The system has advantages over optical systems in dust, precipitation, and contaminated environments. The RF signal can penetrate most wall materials, plastics, carbon fiber, or epoxy.

Example applications include, but are not limited to:
Wind blade deflection for wind power generators,
Linear actuator motion measurement in manufacturing processes,
Through-wall (indoor) survey measurements,
Effector localization on shovels, pick & place robots,
Precision localization of effectors on medical apparatus, and
Doppler measurement of hammer vibration speeds.

Dynamic estimation of the flexion of a golf club through a swing.

Figure 5A:
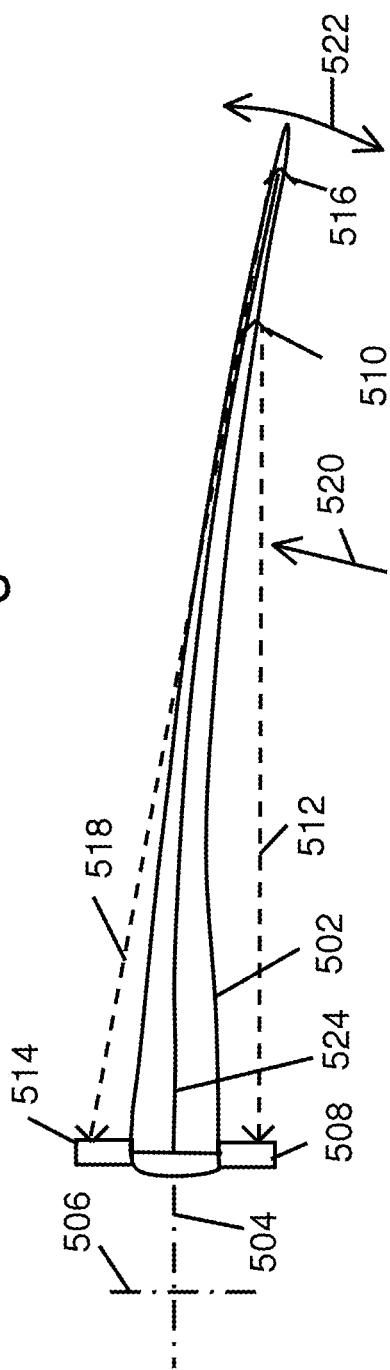
FIG. 5A and FIG. 5B illustrate an exemplary wind blade deflection measurement system in accordance with the present disclosure.
Figure 5B:
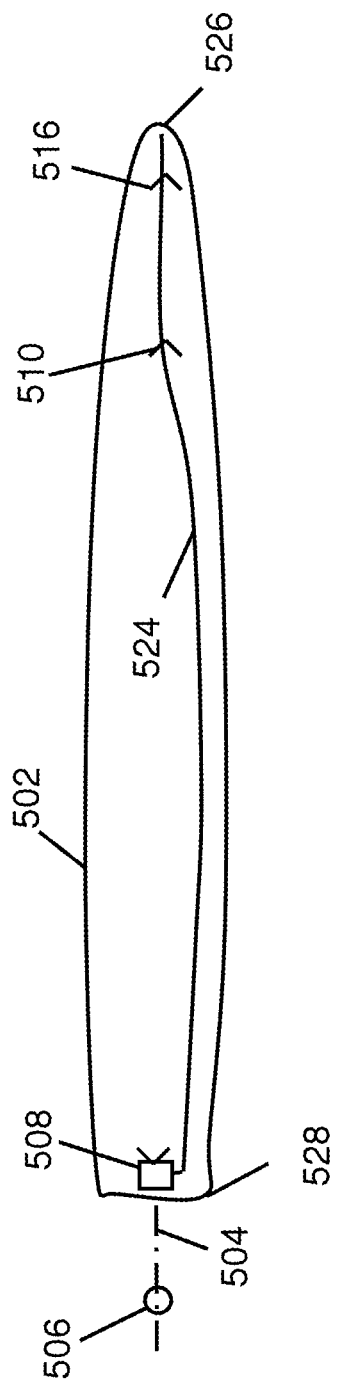

Wind Blade Deflection Measurement for Wind Power Generators,

FIG. 5A and FIG. 5B illustrate an exemplary wind blade deflection measurement system in accordance with the present disclosure. A single wind blade is shown. A typical wind generator may use two, three or more blades for each installation. Each wind blade may be, for example but not limited to, 30 to 60 meters in length. The wind blade is mounted on a hub (not shown) and capable of being rotated about a blade rotation axis to vary the angle of attack of the blade in relation to the wind. The blade rotation angle is adjusted according to a control algorithm to provide maximum efficiency, maximum power, regulate the speed, or for safety and survivability in strong winds. One factor in the control relates to wind blade deflection in response to wind speed, direction, blade speed and position. Accurate wind blade deflection allows the use of longer wind blade construction with lighter materials.

FIG. 5A shows an edge view of a wind blade showing the deflection measurement system. FIG. 5B shows a front view of the wind blade showing the antenna locations. Referring to FIG. 5A, the wind blade 502 is shown with a blade rotation axis 504 and a hub rotation axis 506. The exemplary blade deflection measurement system is shown comprising a first transceiver 508 with receiving antenna, a second receiver 514 with receiving antenna, a transmission cable 524 and two transmit antennas 510 and 516. Cable 524 may typically be terminated at a splitter that splits the power to the two antennas 512 and 516. Alternatively a switch may be used to alternate between antenna 512 and antenna 516. Alternatively, there may be one antenna at the tip 516 that transmits to both sides 514 and 508 at the root A front side (windward side) sensing link 512 comprises a front side transmitting antenna 510 and a front side receiver 508 and receiving antenna. A line of sight sensing path 512 is shown. Also a back side (leeward side) sensing link is shown comprising a back side transmitting antenna 516 and back side receiver 514 and receiving antenna. In operation, the wind 520 applies pressure to the front side (windward side) and causes the blade to bend. As the blade bends, the blade tip moves along arc 522, which causes a slight elongation of propagation path 512 and decrease of propagation path 518. A sensitive measure of the change in path distances may be used to determine deflection along path 522 based on a structural bending model of the blade 502, the front side antenna 508 and back side antenna 514 may be displaced from a center of arc 522 to increase sensitivity to motion of the tip 516. In one variation, triangulation may be used to determine tip position or motion. In a further variation, a change in the delay along path 512 may be combined with a change in the delay along path 518 to determine the bending of the blade according to a bending model or according to experiment.

FIG. 5B shows the front side of the blade. The blade is shown with the front side receiver 508 and front antenna. The cable 524 may be built into the blade 502. In one variation, the cable may be integrated into the lightning protection system of the blade. For example, the shield of the coax may also be used as the lightning protection conductor. The shield of the cable may be connected to a lightning electrode at the tip 526 of the blade and also connected to a ground path at the root 528 of the blade through the hub 506. The hub axis 506 is perpendicular to the plane of the drawing and is denoted by a circle 506.

A further advantage of the wideband system is in the rejection of multipath, for example, multipath reflections from the tower. The pulse repetition rate may be kept low enough to allow decay of multipath from a tower structure to decay substantially, for example 10 dB, before a subsequent pulse is received. Coding and pulse integration may also be used to reduce multipath.

Figure 6A:
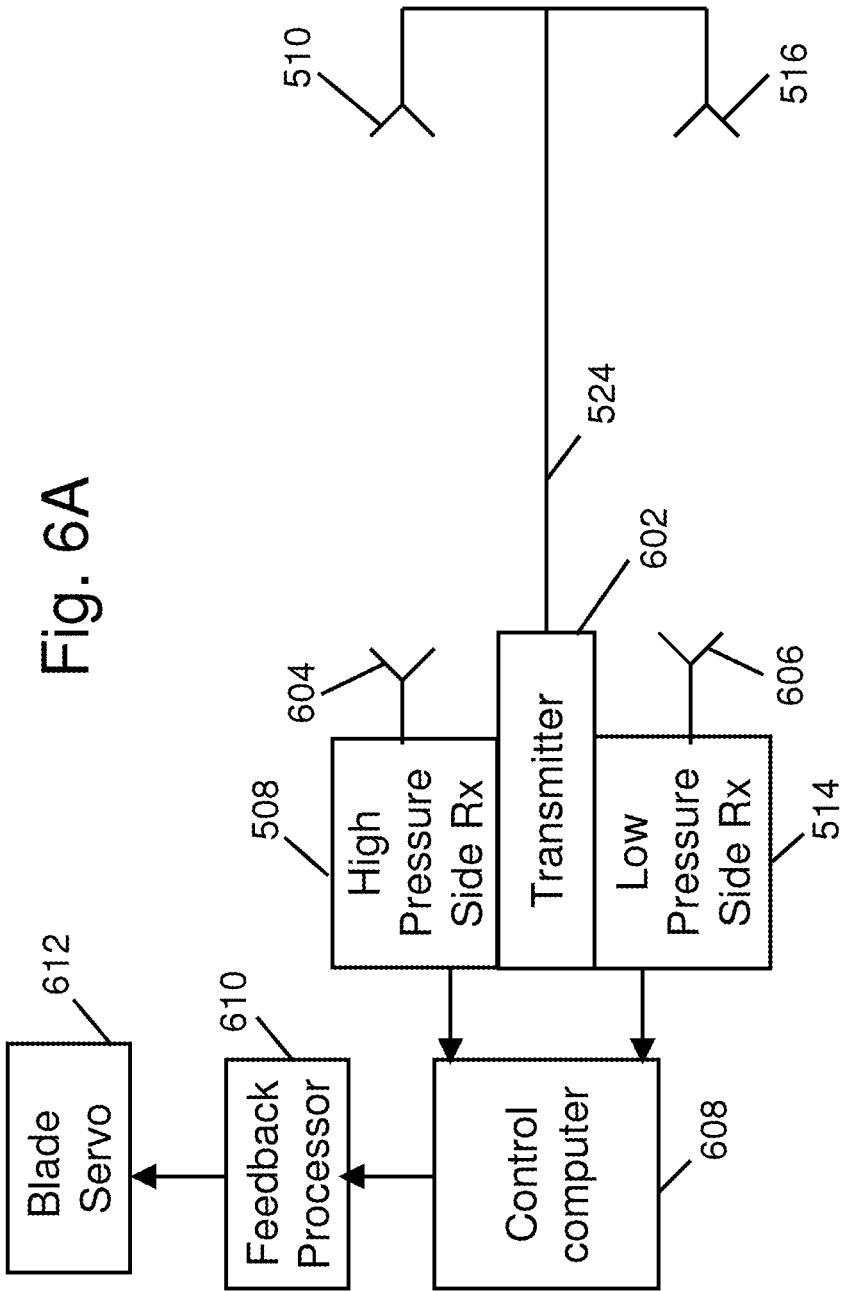
FIG. 6A shows a block diagram of the exemplary system of FIG. 5A.

FIG. 6A shows a block diagram of the exemplary system of FIG. 5A. Referring to FIG. 6, the system comprises a single transmitter 602 and two receivers 508, 514. The transmitter 602 and two receivers operate synchronously from a single timebase. The transmitter 602 transmits a sequence of pulses through cable 524 to the two transmit antennas 510 and 516. The transmitted signal is received by the respective antennas 604 and 606 and receivers 508 and 514. Each receiver processes the delayed return to determine the respective distance. In one variation, the transmitted signals are displaced in time from one another by displacing the antennas along the blade as shown in FIG. 5A or by providing differing lengths of cable. As a result, the respective pulses are displaced in time and can be separated by the respective receivers. For example, each receiver may operate using a scan window (FIG. 2, 224) covering a range for the respective transmitting antenna. The scan windows may cover non-overlapping time spans.

In another variation, two separate transmitters and associated separate receivers may be used to form links for the front and back sides. The two systems may be synchronized, or may be non-synchronized. The two links may be separated by using different codes, pulse repetition rates, time division, or other channelization techniques used by ultra wideband.

Referring again to FIG. 6A, the two distance measurements from the front (high pressure side receiver 508) and back (low pressure side receiver 514) are fed to a control computer 608, which determines the blade deflection and then determines the necessary control. The necessary control is then fed to a feedback processor 610, which drives the blade servo 612 to rotate the blade to the desired angle of attack. Blade deflection is typically a function of lift of the blade due to the aerodynamic forces.

In one variation, a blade deflection measurement may be made on one blade and all blades of the same turbine may be controlled based on the one blade measurement. Alternatively, each blade may have independent blade deflection measurement and associated independent control.

As illustrated, a front and back measurement are made to determine blade deflection. Alternatively, a single measurement may be made (front or back) and control may be based on the single measurement.

FIG. 6B depicts an exemplary function of lift vs. comparison delay as measured in FIG. 6A. Referring to FIG. 6A, Point 616 represents a quiescent origin, i.e., a static blade with no wind. The delay from the high pressure side (windward side) and the delay from the low pressure side (leeward side) are compared. Any difference is a reference delay to be subtracted to yield zero comparison delay at the origin 616. When wind is present, the high pressure side bends to lengthen the distance between antenna 604 and antenna 510, which increases the delay. The low pressure side bends to shorten the distance between antenna 606 and antenna 516, which decreases the delay. Thus the difference increases, generating the function 614 of FIG. 6B. Note that it may not be necessary to explicitly calculate the distance or change in distance. A function may be generated relating timing directly to blade lift. Blade lift may then be input to the control computer to adjust the blade angle of attack, or to adjust blade pitch, as desired.

Linear Actuator Motion Measurement in Manufacturing Processes,

Linear actuators are frequently used in manufacturing processes. Associated position sensors are often indirect reading encoders or other sensors on the gears or motors. There are occasions where bending effects, great length, or geometry require a direct measurement.

Figure 7:
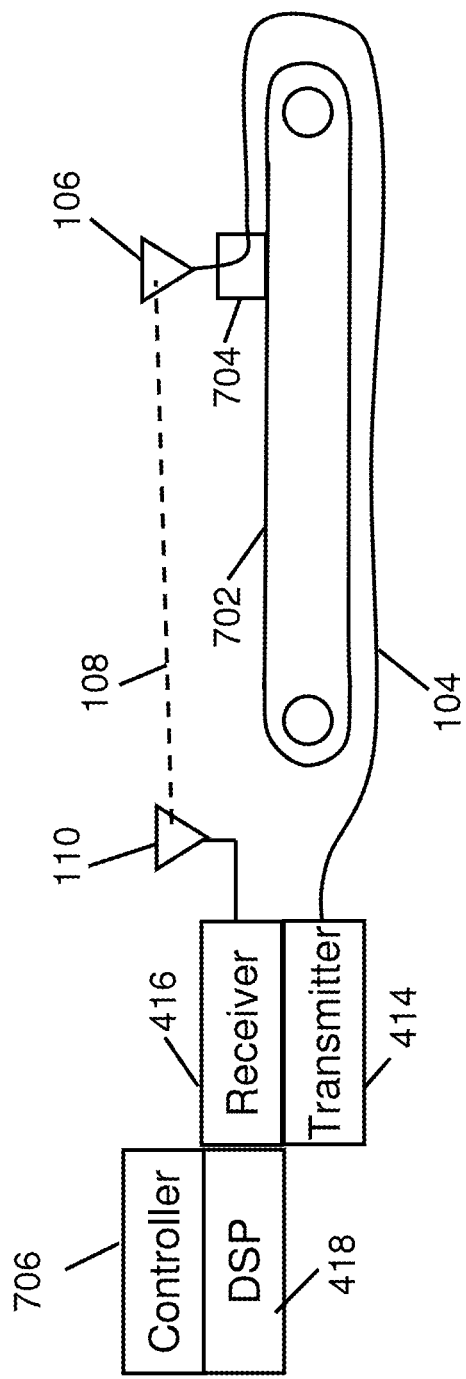
FIG. 7 illustrates an exemplary position sensor coupled to a linear actuator 702.

FIG. 7 illustrates an exemplary position sensor coupled to a linear actuator 702. The position sensor comprises a transmitter 414, receiver 416 and signal processor 418. The transmitted signal is coupled through a flexible cable 104 to a transmit antenna 106 disposed on the movable article 704 to be measured. The position may then be fed to a controller 706. The transmitted signal may be processed to determine a leading edge that is resistant to multipath clutter (see FIG. 2) and can provide an accurate measurement in complex and contaminated environments.

Figure 8:
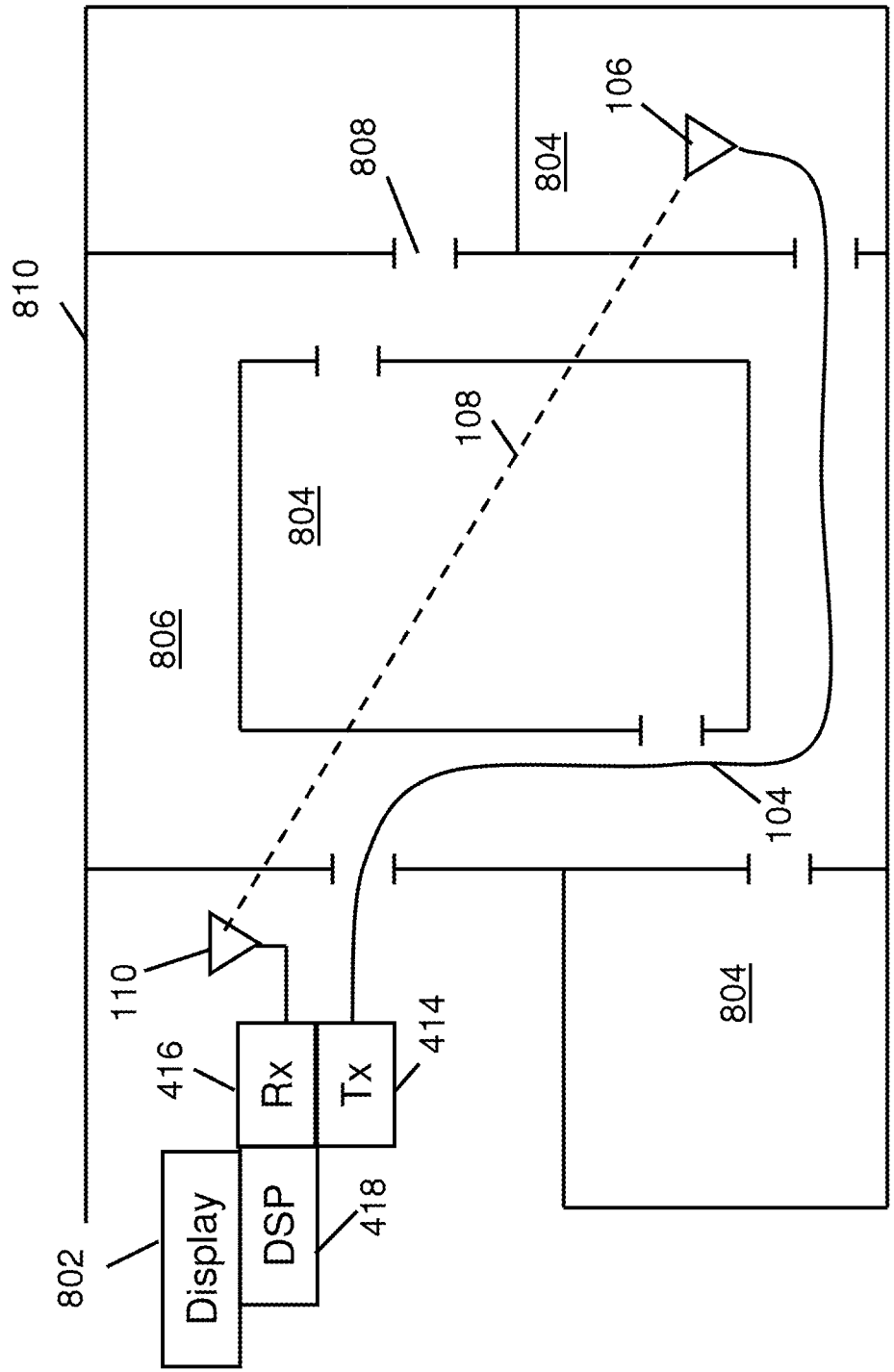
FIG. 8 illustrates an exemplary indoor survey application.

Through-Wall (Indoor) Survey Measurements,

FIG. 8 illustrates an exemplary indoor survey application. FIG. 8 shows an exemplary building 810 with walls, hallway 806, rooms 804 and doors 808. An exemplary system is deployed. A transmitter 414, receiver 416, and processor 418 reside in a corner room. A transmit antenna 106 is connected by cable 104 and carried into a far room. The signal is transmitted from the transmit antenna 106 back to the receiver 110, 106. Distance 108 is measured directly through the walls in the presence of multipath interference. A leading edge may be determined from the received signal related to a direct path signal component representing a straight line signal path 108. The result may then be displayed 802 to a user. The system can survey spaces in the presence of optically opaque walls.

Figure 9:
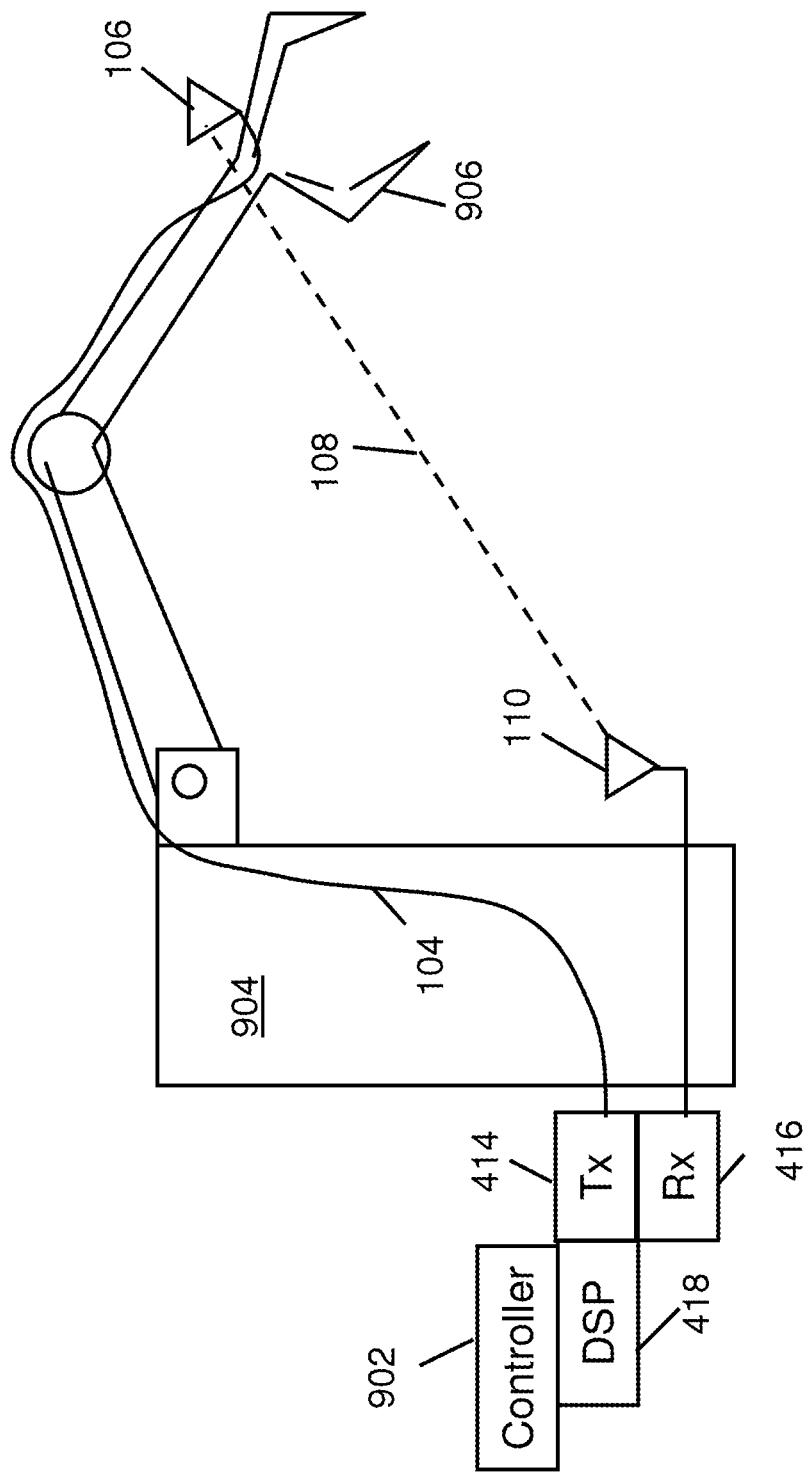
FIG. 9 illustrates an exemplary distance sensor configured for effector localization.

Effector Localization on Shovels, Pick & Place Robots,

FIG. 9 illustrates an exemplary position sensor configured for effector localization. The effector may be, for example but not limited to, a manufacturing robot, a construction crane, a pick and place robot, or other effector. FIG. 8 illustrates the transceiver 414 416 located at or near the root of the effector 904 with the receiving antenna 110 near the root. The transmitting cable 104 runs along the structure of the arm of the effector to the transmitting antenna 106 at the end 906 of the effector. Thus, distance 108 is measured to the end of the effector. In practice, it may be desired to place the receiver on or near the workpiece. It may also be desirable to use multiple receivers or multiple systems to provide multiple axis positioning. (not shown). Precision positioning may allow use of lighter materials and longer effector arms. Lighter structure can result in faster operation.

Figure 10:
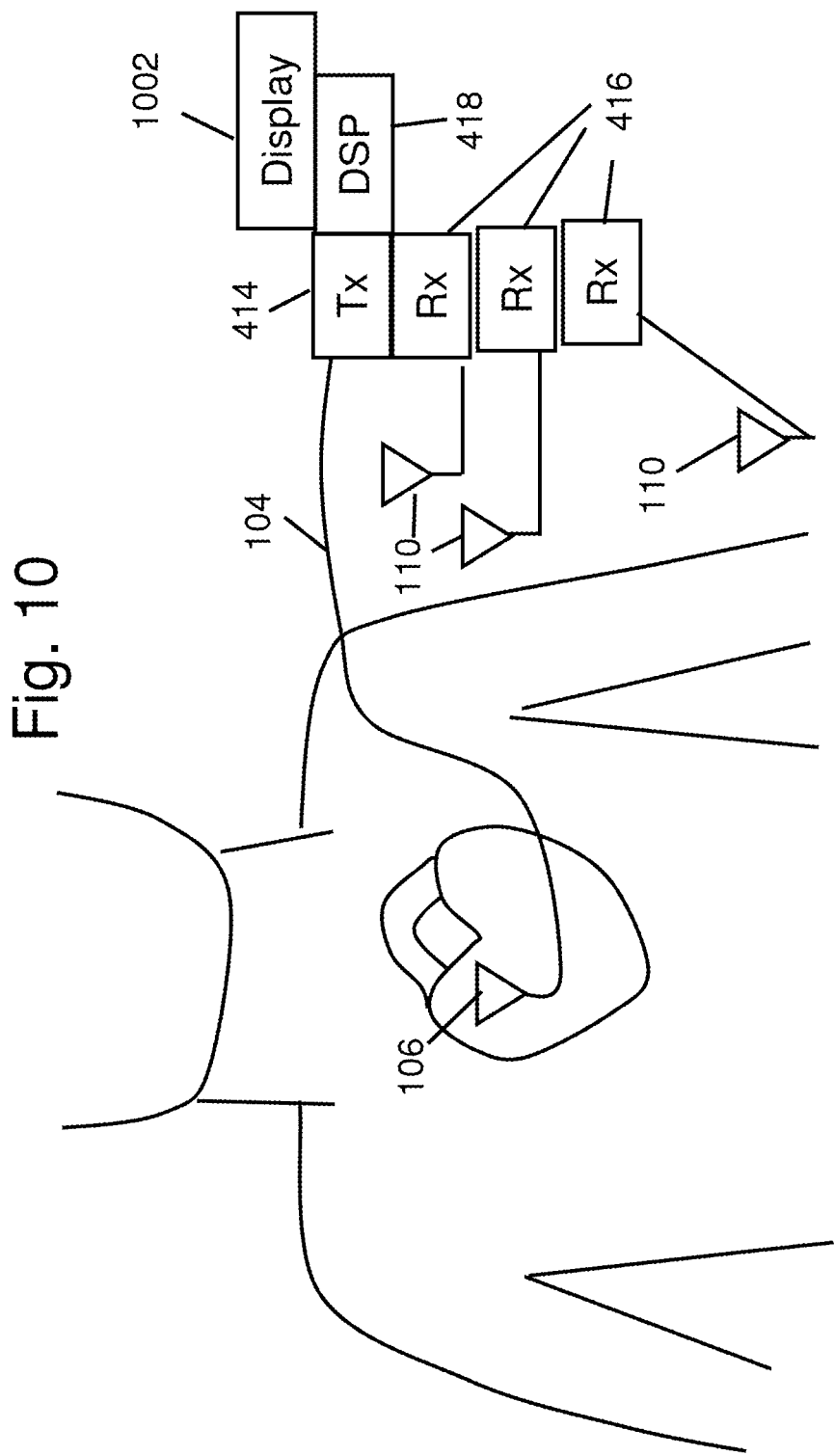
FIG. 10 illustrates an exemplary medical application.

Precision Localization of Effectors on Medical Apparatus,

FIG. 10 illustrates an exemplary medical application. FIG. 10 shows an exemplary patient with a catheter probe. The probe includes a small coax 104 and transmitting antenna 106. Multiple receivers 416 are shown to process the transmitted signal for three dimensional position information. The results may be displayed 1002 to a user. The technique may be used for localization of catheters and implants.

Doppler Measurement of Hammer Vibration Speeds.

Figure 11:
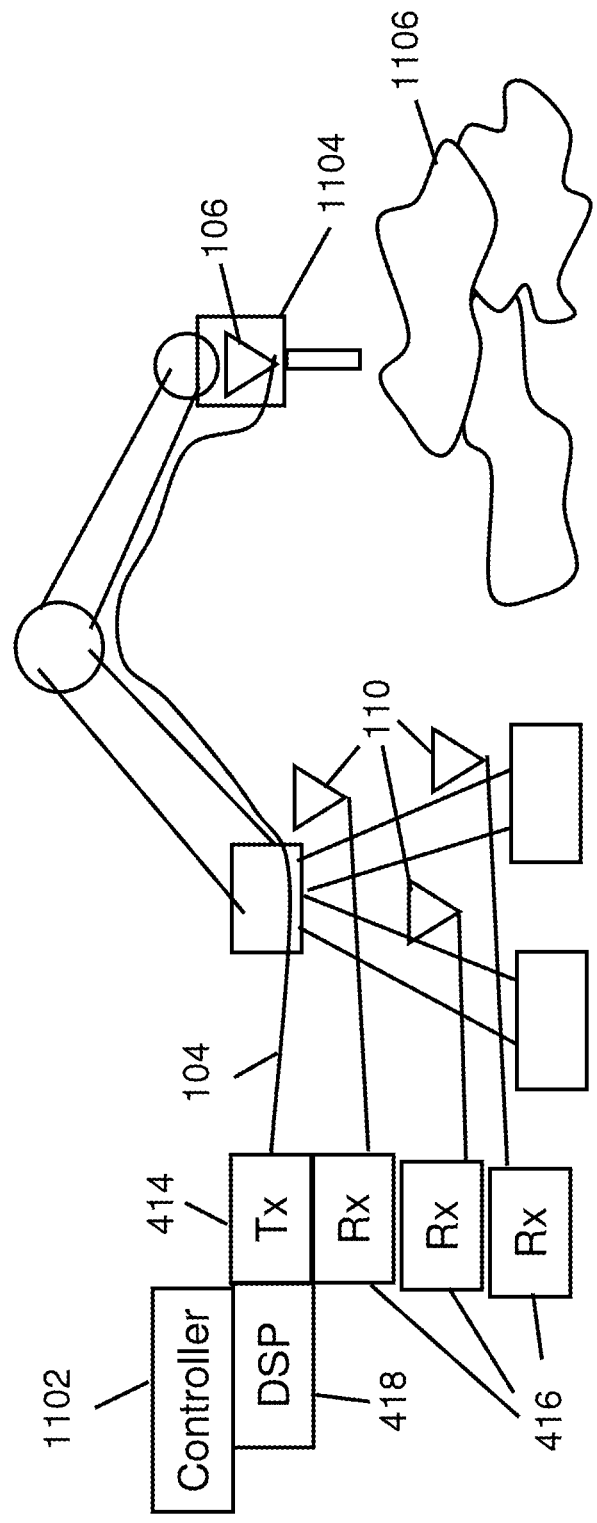
FIG. 11 illustrates an exemplary powered hammer operation. In this example three distances are simultaneously measured allowing for multi-dimensional localization.

FIG. 11 illustrates an exemplary powered hammer operation. FIG. 11 shows an exemplary rock crusher hammer 1104 on a hydraulic boom. A single transmitter antenna 106 is located on the hammer 1104 and three receivers 416 are shown for determining a three dimensional position of the hammer. The results may be used for fine control 1102 of the hammer 1104. Fast parallel scanning and scan to scan correlation may be used to develop Doppler velocity information.

Differential Distance Measurement where Both Ends are Moving, Golf Club Example.

Figure 12:
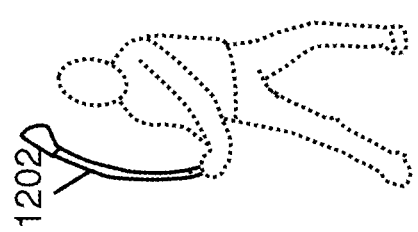
FIG. 12 depicts an exemplary golf club flexion measurement application.

FIG. 12 depicts an exemplary golf club flexion measurement application. It is of interest to measure the bending of a golf club during a swing. FIG. 12 shows the golf club 1202 with exaggerated bending for clarity together with a golfer (shown in dotted lines indicating the golfer is not part of the invention). The golf club may or may not be part of the invention, depending on the claim or other context.

Figure 13:
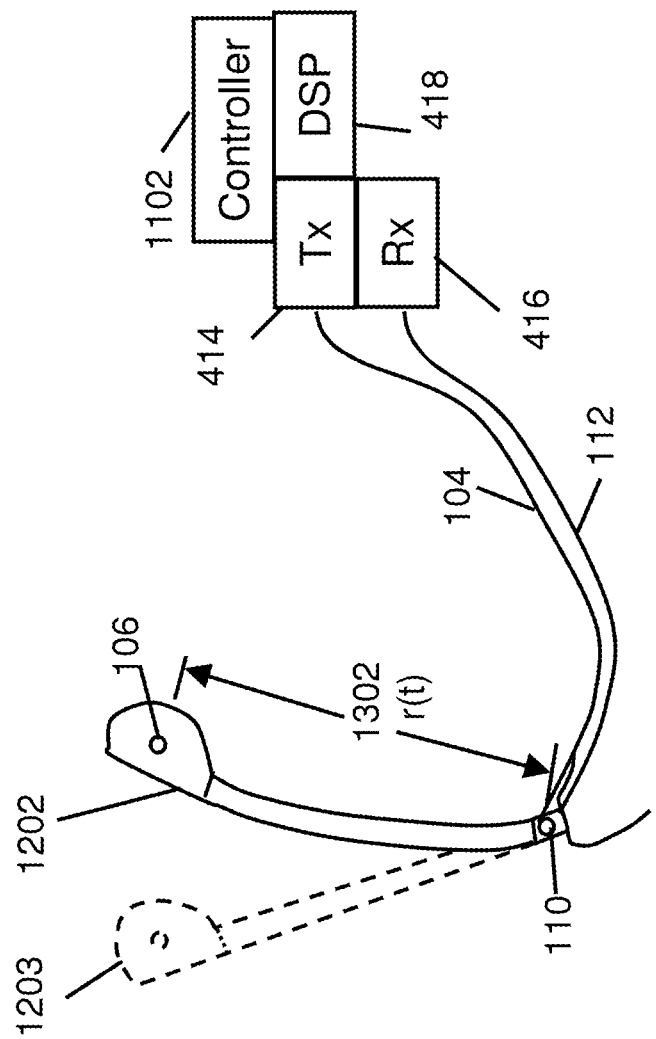
FIG. 13 shows the golf club measurement system of FIG. 12 in greater detail.

FIG. 13 shows the golf club measurement system of FIG. 12 in greater detail. FIG. 13 shows the golf club 1202 in a bent configuration and in a straight configuration 1203. Alternate straight configuration 1203 is shown in dashed lines. The golf club has installed a transmitting antenna 106 connected to a transmitter 414 through fixed length flexible cable 104 and a receiving antenna 110 connected to a receiver 416 through fixed length flexible cable 112. Cable 104 may run through the golf club to reach the end of the club, where the cable is connected to the transmitting antenna 106. The receiving antenna 110 is installed at the handle and connected through cable 112 to the receiver. The transmitter 414 transmits a pulse train and the receiver 416 receives the pulse train and locks onto the pulse train. Small differences in distance 1302 from transmitting antenna 106 to receiving antenna 110 may be observed in the tracking loop.

FIG. 14 depicts a graph of the distance from the handle to the club vs. time for the application of FIG. 12. Graph 1402 depicts a range measurement over the time interval of one swing of the golf club. As the swing begins and the club is accelerated, the club shaft bends. The bending results in a shortening of the distance from the club to the handle. The distance as a function of time may be analyzed with respect to a computer model of the golf club to determine the amount of bending at any point during the swing. During the beginning of the swing, the club accelerates and bending increases. At mid swing, the club strikes the ball causing a slight ball strike disturbance 1404 In the latter portion of the swing, the club decelerates and returns to the original shape.

The golf club example shows the system used for measuring a variable distance between two points on an object when both points are in motion relative to a user reference frame (the frame of the golf club). This example illustrates the capability of measurement of relative distance and thus flexion of a device with both end points in motion. Other such devices could include individual linkages integrated in larger mechanical apparatus.

FIG. 15 depicts a graph of acceleration over time (assuming accelerometers are used as an aiding source in the head of the club.) Comparing graphs 1402 and 1502 shows an inverse correlation between distance and acceleration in this example, thus improving the estimation and characterization of the striking force and effect at times 1404 and 1504. The correlation signal or tracking signal may then be related to change in distance by relating to calibration tests for the system. The correlation graph 1502 shows the initial acceleration, ball strike 1504 and deceleration features.

Further Variations

Figure 16:
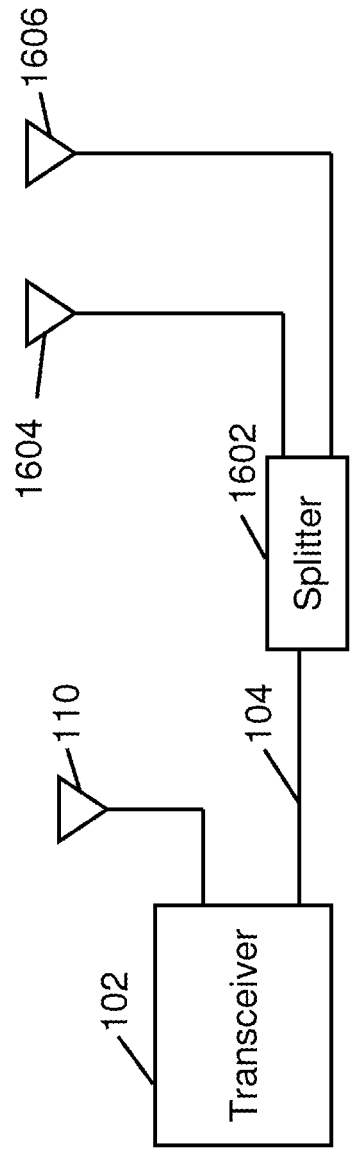
FIG. 16 illustrates an exemplary variation using two transmit antennas and a single receive antenna.

FIG. 16 illustrates an exemplary variation using two transmit antennas and a single receive antenna. Referring to FIG. 16, the transceiver 102 transmits a signal over communication means 104 to a splitter 1602, which divides the signal to a first antenna 1604 and a second antenna 1606. Each antenna 1604 and 1606 transmits a respective signal to antenna 110, which couples the received signals to the receiver section of transceiver 102. As shown, Antenna 1604 is closer than antenna 1606. The distance difference may be used to separate the signals at the receiver. Transceiver 102 may use expected timing to separate the two received signals in the same frequency band. For example a scan window may be formed for the expected timing of a signal from antenna 1604 and signals may then be processed for antenna 1604. Then the scan window may be set for signals in the neighborhood expected for antenna 1606 and then signals may be processed for antenna 1606. Alternatively, two receiver sections may be constructed to process the two time windows in parallel.

Figure 17:
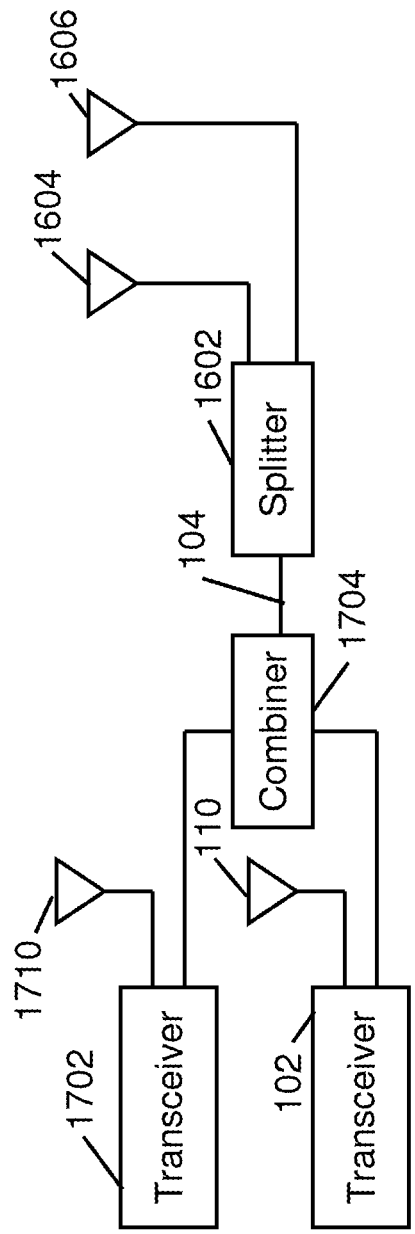
FIG. 17 illustrates an exemplary system using two transceivers combined to a single cable and fed to two transmit antennas.

FIG. 17 illustrates an exemplary system using two transceivers combined to a single cable and fed to two transmit antennas. Referring to FIG. 17. Transceiver 102 and transceiver 1702 have separate transmit and receive ports. The transmit ports are combined 1704 and sent over a communication means 104 to the transmit location. The two transmit signals are split 1602 and fed to two transmit antennas 1604 and 1606, each antenna being fed both signals. The signals are then received by receiving antennas 110 and 1710. The receive antennas 110 and 1710 may be spaced from one another, and the transmit antennas 1604 and 1606 may be spaced from one another. The geometry gives four combinations of transmit-receive antenna pairs that give four time delays and corresponding distances that can be measured, i.e., antenna 1604 to antenna 110, antenna 1604 to antenna 1710, antenna 1606 to antenna 110, and antenna 1606 to antenna 1710. Thus, the four lengths may be combined by triangulation or by including geometrical constraints to determine motion of the object.

Monitoring the time delay between multiple antennas and multiple receive antennas could provide redundancy and can also be used to provide 2 or 3 dimension localization of the beam allowing the monitoring of not only bending but also the twisting of the device, e.g. the wind blade.

FIG. 18 illustrates a further exemplary system using two receive antennas and two transmit antennas. Referring to FIG. 18, receiver 1802 receives a synchronizing signal from transceiver 102 to enable receiver 1802 to calculate transmit—receive delay time from transmit antennas 1604 and 1606. Thus the system of FIG. 18 can measure the four lengths and provide the benefits as described with respect to FIG. 17.

FIG. 19 illustrates a further exemplary system using two receive antennas and two transmit antennas. Referring to FIG. 19, the dual input transceiver 1902 may include a switch to switch between the two antennas 110 and 1910. Thus the system of FIG. 19 can measure the four lengths and provide the benefits as described with respect to FIG. 17.

In FIG. 16 through FIG. 19, the splitter 1602 may be an RF passive power splitter that dives the power to the two antennas. Alternatively, the splitter may be a switch that selects one antenna (e.g., 1604) and alternately selects the other antenna (e.g. 1606) on a predetermined schedule, thus allowing independent measurement of distances from each transmit antenna even though the distances may be very close to one another. The switch 1602 may be controlled through communication means 104, for example, but not limited to a DC or pulse signal on communication means 104. Without the switch, using the power splitter, the antennas 1604 and 1606 should be separated far enough for the multipath from the first antenna to decay before the second pulse arrives from the second antenna 1606 to avoid interference.

Figure 20:
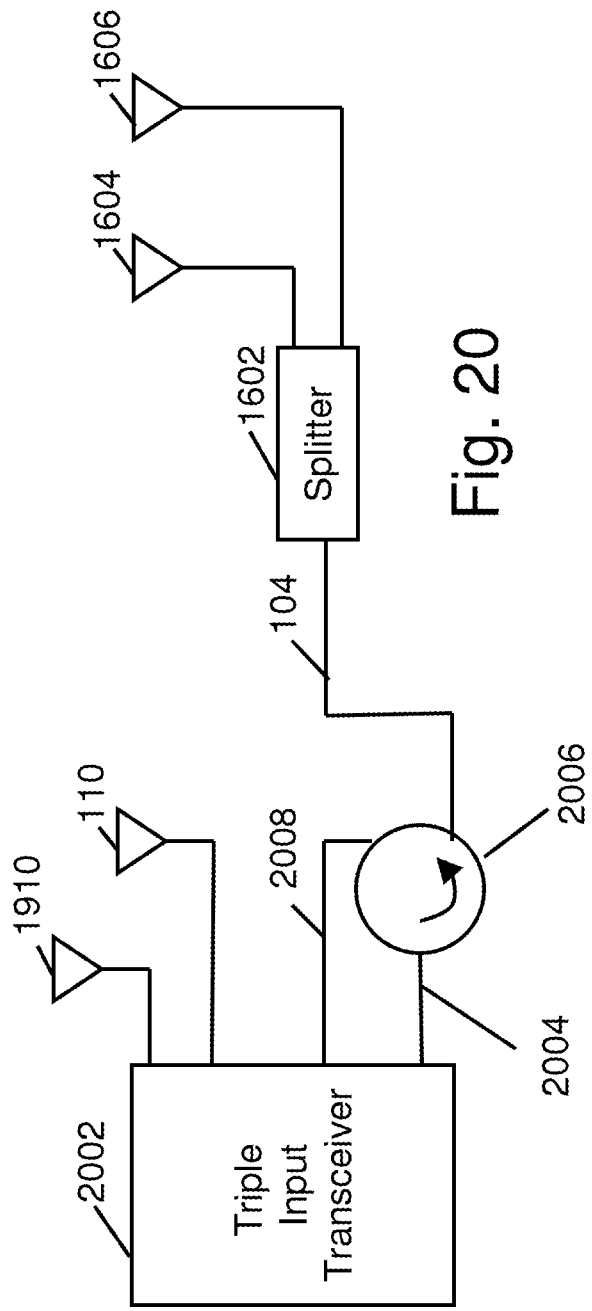
FIG. 20 illustrates an exemplary system using an antenna feed reflection to calibrate system delays.

FIG. 20 illustrates an exemplary system using an antenna feed reflection to calibrate system delays. Referring to FIG. 20, the system comprises a triple input transceiver 2002. Two inputs are coupled to antennas 110 and 1910 as in FIG. 19. The third input 2008 is coupled to a circulator 2006. The transmit output 2004 of the transceiver feeds the circulator 2006 and is then coupled to the link 104 feeding the two antennas 1604 and 1606. A reflection from a slight mismatch of impedance for antenna 1604, for example, would reflect back to the circulator and appear at the third input 2008 of the transceiver 2002, reflection receiver input 2008. The timing of the reflection at the third input may be used to correct for changes in the system internal delays. For example a change in the length and resulting delay of link 104 would result in a double change in the delay of the received reflection at the third input 2008. The change could be used to refine the measurements of delays from antennas 1604 and 1606 to antennas 110 and 1910 by subtracting, for example, half of the observed change in reflected delay from the measured delay of each antenna link.

CONCLUSION

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A range monitoring system, the system comprising:
a first antenna configured to be located at a first location;
a second antenna configured to be located at a second location, the first antenna to be spaced from the second antenna;
and a transceiver, said transceiver comprising a co-located transmitter and receiver, said transceiver coupled to said first antenna through a first communication link and said transceiver coupled to said second antenna through a second communication link; said first communication link adapted for maintaining a known or fixed time delay in the presence of relative motion of said first location relative to said second location;
said first communication link adapted for maintaining a known or fixed time delay in the presence of operative relative motion of said first antenna relative to said transceiver;
said transceiver configured for transmitting a transmitted wide band signal using said first antenna and receiving a received wide band signal responsive to said transmitted wide band signal using said second antenna, said transceiver configured to measure a first time difference between said transmitted wide band signal and said received wide band signal, said first time difference indicative of said range
wherein the first communication link is a flexible transmission line sufficiently flexible to allow said operative relative motion of said first antenna relative to said transceiver.

2. The range monitoring system in accordance with claim 1, wherein said transceiver comprises a correlation based scanning receiver configured to determine a leading edge of the received wide band signal to determine said first time difference.

3. The range monitoring system in accordance with claim 2, wherein said transceiver is operable to calculate a first range between said first location of the first antenna and said second location of the second antenna based on said first time difference between said transmitted wide band signal and said received wide band signal.

4. The range monitoring system in accordance with claim 3, wherein said transceiver is operable to calculate a reference range between said first location of the first antenna and said second location of the second antenna, and said transceiver is operable to calculate a range difference between said reference range and said first range.

5. The range monitoring system in accordance with claim 1, wherein said transceiver comprises electronics and said transceiver is configured to calculate a corrected time difference based on said first time difference and a known delay due to said electronics.

6. The range monitoring system in accordance with claim 1, wherein said transceiver is configured to calculate a corrected time difference based on said first time difference and a known delay due to said first communication link.

7. The range monitoring system in accordance with claim 1, wherein said first location and said second location are connected by a flexible member, said first range being responsive to flexing of said flexible member; and wherein the system is configured to calculate said first range when both the first antenna and second antenna are capable of motion relative to said transceiver.

8. The range monitoring system in accordance with claim 1, wherein said transmitted wide band signal comprises a chirp or a swept sine wave.

9. The range monitoring system in accordance with claim 1, wherein the transceiver further comprises at least one additional receiver and at least one additional antenna connected to said at least one additional receiver; said at least one additional receiver receiving said transmitted signal and computing a second time difference and a second range;
   said system combining said first range and said second range using trilateration to determine a position of said first location.

10. The range monitoring system in accordance with claim 1, further including a wind power blade; wherein said first antenna is positioned on the tip half of said wind power blade and said second antenna is positioned on the root half of said wind power blade.

11. The range monitoring system in accordance with claim 10, further including a wind power blade controller; wherein said wind power blade controller is configured to control a pitch or angle of attack of said wind power blade based on said first time difference.

12. The range monitoring system in accordance with claim 1, wherein said transceiver is configured to determine a channel impulse response from said first antenna to said second antenna, and said transceiver is configured to determine said first time difference based on said channel impulse response.

13. The range monitoring system in accordance with claim 12, wherein said transceiver is configured to determine a leading edge based on said channel impulse response, and said transceiver determines said first time difference based on said leading edge.

14. The range monitoring system in accordance with claim 13, wherein the transceiver is configured to apply a scanning receiver scan window to monitor for determination of said leading edge.

15. The range monitoring system in accordance with claim 1, further including a wind blade structure, and wherein the first receiver is an impulse wideband receiver; wherein a pulse repetition rate is low enough to allow decay of multipath from a tower structure to decay at least 10 dB before a subsequent pulse is received.

16. A method for range monitoring, the method comprising the steps of:
   providing a first antenna at a first location;
   providing a second antenna at a second location, the first antenna spaced from the second antenna; said first antenna and said second antenna configured to allow a first operative motion between said first antenna and said second antenna;
   providing a transmitter coupled to said first antenna through a first communication link; said first communication link sufficiently flexible to allow a second operative motion between said first antenna and said transmitter;
   providing a first receiver coupled to said second antenna through a second communication link; said first receiver synchronized in time to said first transmitter based on a time synchronization signal from a common time base; said first receiver comprising a processor;
   said transmitter transmitting a transmitted signal from said transmitter through the first antenna; said first receiver receiving a received signal through said second antenna responsive to said transmitted signal;
   said first receiver measuring a reference time difference between said received signal and said transmitted signal;
   said processor determining a reference time of flight of said transmitted signal for a known configuration of said first antenna and said second antenna based on said reference time difference;
   said processor determining a first time of flight of said transmitted signal for an unknown configuration of said first antenna and said second antenna;
   said processor determining a first change in time of flight of said transmitted signal for said unknown configuration by comparing said first time of flight and said reference time of flight; and
   said processor calculating a first change of range between the first antenna and the second antenna based on said first change of time of flight of said signal transmitted from the first antenna;
   wherein the first communication link comprises a flexible transmission line sufficiently flexible to allow said first operative motion and said second operative motion.

17. The method in accordance with claim 16, wherein the first receiver comprises a correlation based scanning receiver, further including the step: said processor determining a leading edge of the received signal to determine said first of time of flight.

18. The method for range monitoring in accordance with claim 17, wherein the first receiver is configured to apply a scanning receiver scan window for said determination of said leading edge.

19. The method for range monitoring in accordance with claim 16, further including a flexible member connected between said first location and said second location, said first time of flight being responsive to flexing of said flexible member; further including the step: moving the first antenna and second antenna relative to said first receiver.

20. The method for range monitoring in accordance with claim 19, further including a second receiver and a third antenna connected to said second receiver; said third antenna generating a second received signal responsive to said transmitted signal; said second receiver computing a second time of flight based on said second received signal, and said second receiver computing a second change of range by comparing said second time of flight with a second reference time of flight; said method further including step:

said processor combining said first change of range and said second change of range using trilateration to determine a change of position of said first antenna.

21. The method for range monitoring in accordance with claim 20, further including a wind power blade having said first antenna on a tip half of said wind power blade and having said second antenna on a root half of said wind power blade; and the change of position is a relative position of said first antenna compared with a position of said second antenna.

22. The method for range monitoring in accordance with claim 21, further including a step: said processor controlling a pitch or angle of attack of the wind power blade based on said relative position of said first antenna.

23. A lift sensor for controlling a wind power blade comprising:

a first antenna disposed at a first location on said wind power blade;

a second antenna disposed at a second location on said wind power blade, said second location spaced longitudinally along said wind power blade;

a transceiver coupled through a first communication link to said first antenna for transmitting a transmitted signal;

said transceiver configured to receive a received wideband signal responsive to said transmitted wideband signal;

said transceiver configured to determine a time of arrival of said received wideband signal relative to said transmitted wideband signal;

said transceiver configured to calculate a lift value based on said time of arrival.

24. The lift sensor in accordance with claim 23, wherein said transceiver is configured for measuring a reflection arrival time of a reflection back along said first communication link to said transceiver;

said transceiver further configured for comparing said reflection arrival time with a reference reflection arrival time for said reflection to derive a correction time; and said transceiver further configured for correcting said time of arrival based on said correction time.

25. The lift sensor in accordance with claim 24, wherein said transceiver comprises a reflection receiver and said reflection is coupled from said first communication link through a circulator to said reflection receiver for determination of said reflection arrival time.

26. The lift sensor in accordance with claim 25, wherein the first receiver comprises a correlation based scanning receiver, said first receiver configured for determining a leading edge of the received wideband signal to determine said time of arrival.

27. A method for sensing a lift value for a wind turbine blade comprising:

providing a transceiver comprising a processor;

said transceiver measuring a time of flight by comparing a transmitted time to a received time for a signal transmitted between a pair of antennas, at least one antenna of said pair of antennas disposed on a tip half of said wind turbine blade, said time of flight responsive to a bending of said wind turbine blade due to aerodynamic loading; and said transceiver determining said lift value as a direct function of said time of flight.

28. The method in accordance with claim 27, wherein the determining step comprises:

said processor comparing said time of flight with a predetermined reference time of flight to generate a comparison value and determining said lift value based on said comparison value.

29. The method in accordance with claim 27, wherein at least one antenna of said pair of antennas is disposed toward a low pressure side of said wind turbine blade.

30. The method in accordance with claim 27, wherein the first receiver comprises a correlation based scanning receiver, further including the step: said receiver determining a leading edge of the received signal to determine said time of flight.

31. The method for range monitoring in accordance with claim 30, wherein the first receiver is configured to apply a scanning receiver scan window for said determination of said leading edge.

32. The method for range monitoring in accordance with claim 31, wherein said transmitted signal comprises an ultra wideband signal.

* * * * *